(12) United States Patent
Lee et al.

(10) Patent No.: US 11,515,715 B2
(45) Date of Patent: Nov. 29, 2022

(54) ELECTRONIC DEVICE FOR RECEIVING WIRELESS POWER AND METHOD FOR WIRELESS CHARGING THEREOF

(71) Applicant: Samsung Electronics Co., Ltd., Suwon-si (KR)

(72) Inventors: Juhyang Lee, Suwon-si (KR); Yusu Kim, Suwon-si (KR); Kyungmin Park, Suwon-si (KR); Wooram Lee, Suwon-si (KR); Byungyeol Choi, Suwon-si (KR); Yongsang Yun, Suwon-si (KR); Chihyun Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 236 days.

(21) Appl. No.: 16/513,474

(22) Filed: Jul. 16, 2019

(65) Prior Publication Data

US 2020/0021121 A1 Jan. 16, 2020

(30) Foreign Application Priority Data

Jul. 16, 2018 (KR) .................. 10-2018-0082320

(51) Int. Cl.
*H02J 7/00* (2006.01)
*H02J 50/80* (2016.01)
(Continued)

(52) U.S. Cl.
CPC ...... *H02J 7/0036* (2013.01); *H02J 7/007192* (2020.01); *H02J 7/025* (2013.01); *H02J 50/12* (2016.02); *H02J 50/80* (2016.02)

(58) Field of Classification Search
CPC .......... H02J 7/0036; H02J 50/80; H02J 50/12; H02J 7/007192; H02J 7/025
See application file for complete search history.

(56) References Cited

U.S. PATENT DOCUMENTS 8,798,537 B2 * 8/2014 Lee .................. H02J 50/60
455/41.1
9,356,461 B2 5/2016 Howard et al.
(Continued)

FOREIGN PATENT DOCUMENTS

EP 3276791 A1 1/2018
JP 4274276 B2 6/2009
(Continued)

OTHER PUBLICATIONS

European Search Report dated Nov. 22, 2019 in connection with European Patent Application No. 19 18 6518, 8 pages.
(Continued)

*Primary Examiner* — Nghia M Doan

(57) ABSTRACT

According to various embodiments, an electronic device may include: a battery; a charging circuit; a wireless power reception circuit configured to acquire transmission power wirelessly output from an external electronic device; and a processor, wherein the processor is configured to charge the battery through the charging circuit by using reception power acquired through the wireless power reception circuit, obtain status information related to the charging operation during the charging operation, and transmit a specified signal, corresponding to pausing of the transmission power, to the external electronic device such that the external electronic device pauses outputting of the transmission power, at least on the basis of the status information. In addition to the various embodiments according, other various embodiments are also possible.

17 Claims, 13 Drawing Sheets

(51) Int. Cl.
    *H02J 50/12*     (2016.01)
    *H02J 7/02*     (2016.01)

(56) References Cited

U.S. PATENT DOCUMENTS

| | | | |
|---|---|---|---|
| 9,716,396 B2 * | 7/2017 | Lee | H02J 50/40 |
| 9,735,610 B2 * | 8/2017 | Colja | H02J 50/10 |
| 2008/0197804 A1 | 8/2008 | Onishi et al. | |
| 2012/0153894 A1 | 6/2012 | Widmer | |
| 2013/0057078 A1 | 3/2013 | Lee et al. | |
| 2013/0225077 A1 | 8/2013 | Schultz et al. | |
| 2016/0372977 A1 | 12/2016 | Nago | |
| 2017/0047769 A1 | 2/2017 | Kim et al. | |
| 2017/0070080 A1 | 3/2017 | Kang et al. | |
| 2017/0141604 A1 * | 5/2017 | Park | H02J 7/025 |
| 2017/0194816 A1 | 7/2017 | Tsuda et al. | |
| 2017/0353054 A1 | 12/2017 | Lee | |

FOREIGN PATENT DOCUMENTS

| | | | | |
|---|---|---|---|---|
| KR | 10-2017-0024999 A | 3/2017 | | |
| KR | 10-2019-0042401 A | 4/2019 | | |
| WO | WO-2017094997 A1 * | 6/2017 | | H02J 50/80 |
| WO | WO-2019027158 A1 * | 2/2019 | | H02J 50/80 |

OTHER PUBLICATIONS

International Search Report dated Oct. 24, 2019 in connection with International Patent Application No. PCT/KR2019/008778, 3 pages.
Written Opinion of the International Searching Authority dated Oct. 24, 2019 in connection with International Patent Application No. PCT/KR2019/008778, 6 pages.

\* cited by examiner

ELECTRONIC DEVICE FOR RECEIVING WIRELESS POWER AND METHOD FOR WIRELESS CHARGING THEREOF

CROSS-REFERENCE TO RELATED APPLICATION

This application is based on and claims priority under 35 U.S.C. § 119 to Korean Patent Application No. 10-2018-0082320, filed on Jul. 16, 2018, in the Korean Intellectual Property Office, the disclosure of which is herein incorporated by reference in its entirety.

BACKGROUND

1. Field

Various embodiments relate to an electronic device for receiving wireless power and a wireless charging method using the same.

2. Description of Related Art

The above information is presented as background information only to assist with an understanding of the disclosure. No determination has been made, and no assertion is made, as to whether any of the above might be applicable as prior art with regard to the disclosure.

Electronic devices can perform wireless charging or inductive charging, by using a wireless power transfer technology. The wireless power transfer technology can be a technology in which power is wirelessly transmitted from a power transmission device to a power reception device, without any connector connecting the power reception device and the power transmission device, so as to charge a battery of the power reception device. The wireless power transfer technology can include a magnetic induction type and a magnetic resonance type and also include various types of wireless power transfer technologies.

SUMMARY

While a battery of an electronic device is charged through a power transmission device, situations dangerous or requiring no more wireless charging may occur, for example, the battery is considered in a fully-charged state or the electronic device is considered in an abnormal state. The power transmission device may output power even in such situations. Accordingly, the battery of the electronic device may keep being charged even in situations dangerous or requiring no more wireless charging.

An electronic device according to various embodiments can transmit a signal for pausing power output of a power transmission device to the power transmission device, when it is determined that a battery is in a fully-charged state or the electronic device is in an abnormal state while the battery is charged through the power transmission device. Accordingly, a battery charging operation of the electronic device can be paused in situations dangerous or requiring no more wireless charging.

An electronic device according to various embodiments can make no response to a power transmission device when it is determined that a battery is in a fully-charged state or the electronic device is in an abnormal state while the battery is charged through a power transmission device. Accordingly, a wireless charging operation or battery charging operation can be paused.

An electronic device according to various embodiments can perform an operation of detecting whether a power transmission device is detached, in a state where a wireless charging operation or battery charging operation is paused, and can resume the battery charging operation when wireless charging or battery charging resumption conditions are satisfied.

According to various embodiments, an electronic device may include: a battery; a charging circuit; a wireless power reception circuit configured to acquire transmission power wirelessly output from an external electronic device; and a processor, wherein the processor is configured to charge the battery through the charging circuit by using reception power acquired through the wireless power reception circuit, obtain status information related to the charging operation while the charging operation is performed, and transmit a specified signal, corresponding to pausing of the transmission power, to the external electronic device such that the external electronic device pauses an operation of outputting of the transmission power, at least on the basis of the status information.

According to various embodiments, an electronic device may include: a battery; a charging circuit; a wireless power reception circuit configured to acquire transmission power wirelessly output from the external electronic device; and a processor, wherein the processor is configured to charge the battery through the charging circuit by using reception power acquired through the wireless power reception circuit, obtain status information related to the charging operation, and not transmit, to the external electronic device, any response signal in response to a signal transmitted from the external electronic device, at least on the basis of the status information.

According to various embodiments, a method for wirelessly charging an electronic device receiving power wirelessly may include the operations of: receiving, through a wireless power reception circuit, power wirelessly output from an external electronic device; charging a battery by using the received power; obtaining status information related to the operation of charging the battery during the operation of charging the battery; and transmitting a specified signal, corresponding to pausing the transmission power, to the external electronic device such that the external electronic device pauses an operation of outputting the transmission power, at least on the basis of the status information.

According to various embodiments, a method for wirelessly charging an electronic device receiving power wirelessly may include the operations of: receiving, through a wireless power reception circuit, power wirelessly output from an external electronic device; charging a battery by using the received power; obtaining status information related to the operation of charging the battery during the operation of charging the battery; and performing control such that no response signal in response to a signal transmitted from the external electronic device is transmitted to the external electronic device, at least on the basis of the status information.

An electronic device according to various embodiments can transmit a signal for pausing power output of a power transmission device to the power transmission device when it is determined that a battery is in a fully-charged state or that the electronic device is in an abnormal state, and thus a wireless charging operation or battery charging operation of the electronic device can be paused in situations dangerous or requiring no more wireless charging. When it is determined that the battery is in a fully-charged state or the electronic device is in an abnormal state, the electronic device makes no response to the power transmission device, and thus the wireless charging operation or battery charging operation can be paused. Since power output of the power transmission device can be paused or no response can be made to the power transmission device, not only can the electronic device be protected but also a degree to which the electronic device heats up can be reduced.

An electronic device according to various embodiments, in a state where a wireless charging operation or battery charging operation is paused, can resume the battery charging operation by taking account of wireless charging or battery charging resumption conditions or whether the power transmission device is detached.

An electronic device according to various embodiments can pause charging of the electronic device when the wireless charging operation is not necessary, and can resume the wireless charging operation of the electronic device when the wireless charging operation is necessary. Therefore, charging efficiency can be improved.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document. Those of ordinary skill in the art should understand that in many, if not most instances, such definitions apply to prior, as well as future uses of such defined words and phrases.

BRIEF DESCRIPTION OF THE DRAWINGS

For a more complete understanding of the disclosure and its advantages, reference is now made to the following description taken in conjunction with the accompanying drawings, in which like reference numerals represent like parts.

DETAILED DESCRIPTION

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Figure 1:
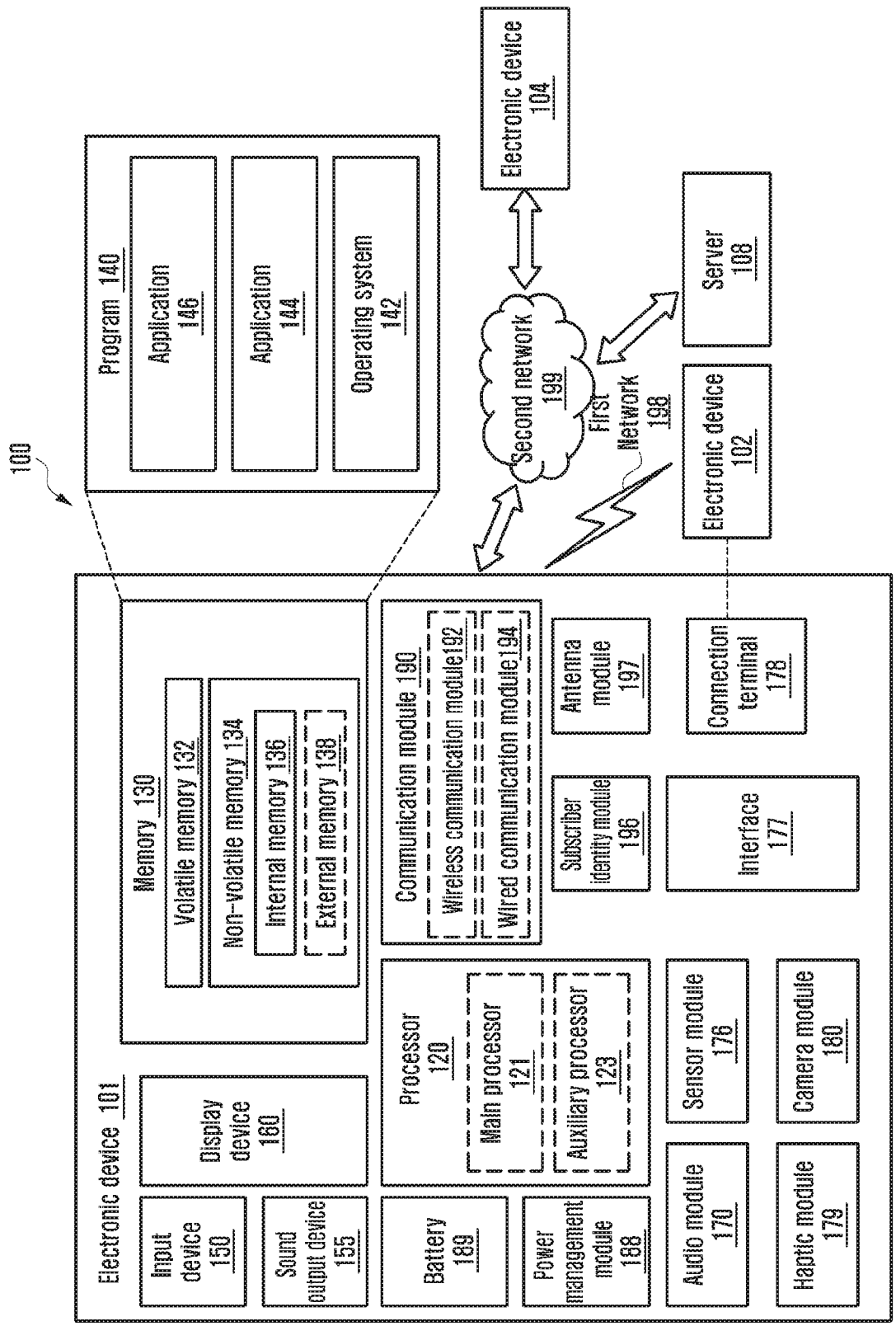
FIG. 1 is a block diagram illustrating an electronic device receiving wireless power in a network environment according to various embodiments.

FIG. 1 is a block diagram illustrating an electronic device 101 receiving wireless power in a network environment 100 according to various embodiments of the disclosure.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190 (e.g., a transceiver), a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming call. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) (e.g., a wireless transceiver) or a wired communication module 194 (e.g., a local area network (LAN) communication module or a power line communication (PLC) module) (e.g., a wired transceiver). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
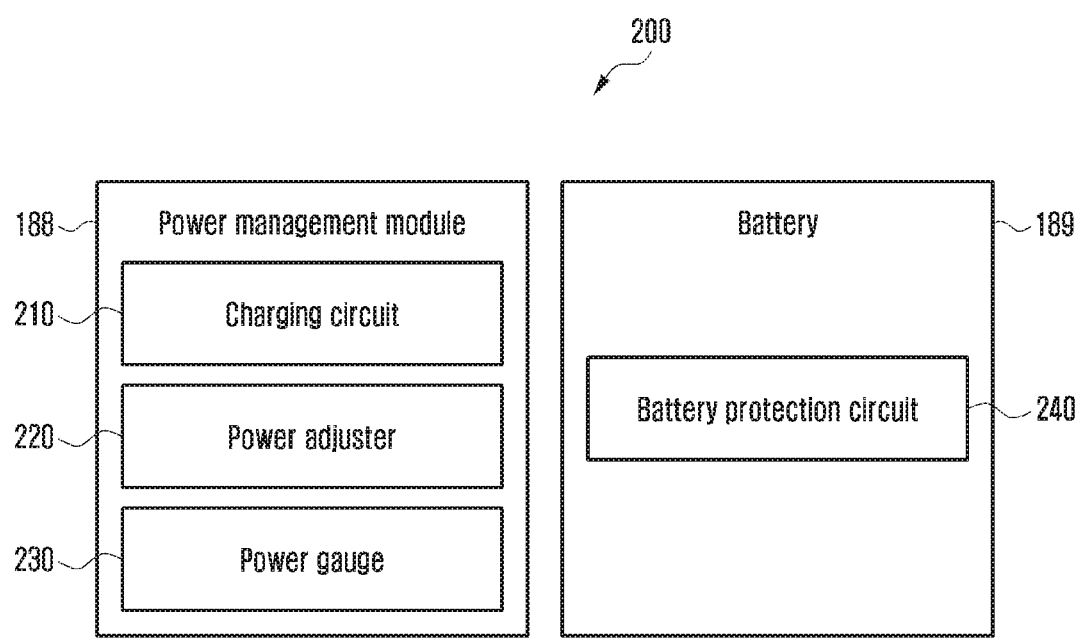
FIG. 2 is a block diagram illustrating a power management module and a battery according to various embodiments.

FIG. 2 is a block diagram 200 illustrating the power management module 188 and the battery 189 according to various embodiments.

Referring to FIG. 2, the power management module 188 may include charging circuitry 210, a power adjuster 220, or a power gauge 230. The charging circuitry 210 may charge the battery 189 by using power supplied from an external power source outside the electronic device 101. According to an embodiment, the charging circuitry 210 may select a charging scheme (e.g., normal charging or quick charging) based at least in part on a type of the external power source (e.g., a power outlet, a USB, or wireless charging), magnitude of power suppliable from the external power source (e.g., about 20 Watt or more), or an attribute of the battery 189, and may charge the battery 189 using the selected charging scheme. The external power source may be connected with the electronic device 101, for example, directly via the connecting terminal 178 or wirelessly via the antenna module 197.

The power adjuster 220 may generate a plurality of powers having different voltage levels or different current levels by adjusting a voltage level or a current level of the power supplied from the external power source or the battery 189. The power adjuster 220 may adjust the voltage level or the current level of the power supplied from the external power source or the battery 189 into a different voltage level or current level appropriate for each of some of the components included in the electronic device 101. According to an embodiment, the power adjuster 220 may be implemented in the form of a low drop out (LDO) regulator or a switching regulator. The power gauge 230 may measure use state information about the battery 189 (e.g., a capacity, a number of times of charging or discharging, a voltage, or a temperature of the battery 189).

The power management module 188 may determine, using, for example, the charging circuitry 210, the power adjuster 220, or the power gauge 230, charging state information (e.g., lifetime, over voltage, low voltage, over current, over charge, over discharge, overheat, short, or swelling) related to the charging of the battery 189 based at least in part on the measured use state information about the battery 189. The power management module 188 may determine whether the state of the battery 189 is normal or abnormal based at least in part on the determined charging state information. If the state of the battery 189 is determined to abnormal, the power management module 188 may adjust the charging of the battery 189 (e.g., reduce the charging current or voltage, or stop the charging). According to an embodiment, at least some of the functions of the power management module 188 may be performed by an external control device (e.g., the processor 120).

The battery 189, according to an embodiment, may include a protection circuit module (PCM) 240. The PCM 240 may perform one or more of various functions (e.g., a pre-cutoff function) to prevent a performance deterioration of, or a damage to, the battery 189. The PCM 240, additionally or alternatively, may be configured as at least part of a battery management system (BMS) capable of performing various functions including cell balancing, measurement of battery capacity, count of a number of charging or discharging, measurement of temperature, or measurement of voltage.

According to an embodiment, at least part of the charging state information or use state information regarding the battery 189 may be measured using a corresponding sensor (e.g., a temperature sensor) of the sensor module 176, the power gauge 230, or the power management module 188. According to an embodiment, the corresponding sensor (e.g., a temperature sensor) of the sensor module 176 may be included as part of the PCM 240, or may be disposed near the battery 189 as a separate device.

Figure 3:
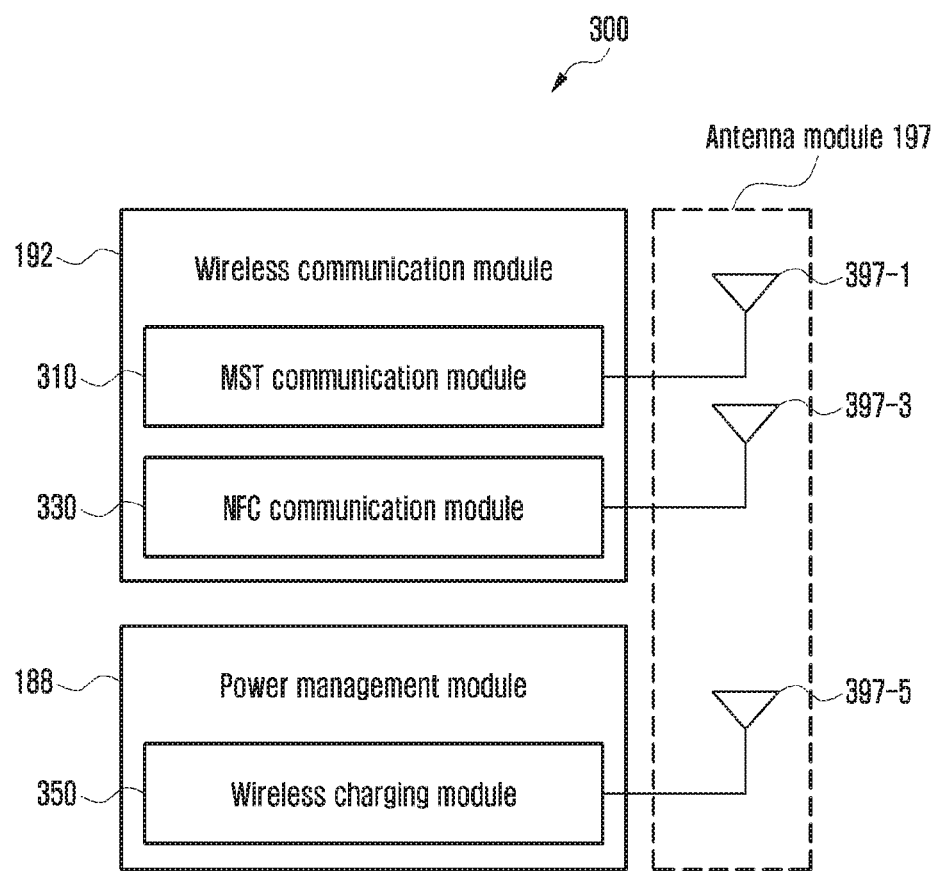
FIG. 3 is a block diagram illustrating a wireless communication module, a power management module, and an antenna module of an electronic device according to various embodiments.

FIG. 3 is a block diagram 300 illustrating a wireless communication module 192, a power management module 188, and an antenna module 197 of an electronic device according to various embodiments.

Referring to FIG. 3, the wireless communication module 192 may include a magnetic secure transmission (MST) communication module 310 or a near-field communication (NFC) module 330, and the power management module 188 may include a wireless charging module 350. In such a case, the antenna module 197 may include a plurality of antennas that include a MST antenna 397-1 connected with the MST communication module 310, a NFC antenna 397-3 connected with the NFC communication module 330, and a wireless charging antenna 397-5 connected with the wireless charging module 350. For ease of description, the same components as those described in regard to FIG. 1 are briefly described or omitted from the description.

The MST communication module 310 may receive a signal containing control information or payment information such as card information from the processor 120, generate a magnetic signal corresponding to the received signal, and then transfer the generated magnetic signal to the external electronic device 102 (e.g., a point-of-sale (POS) device) via the MST antenna 397-1. To generate the magnetic signal, according to an embodiment, the MST communication module 310 may include a switching module (not shown) that includes one or more switches connected with the MST antenna 397-1, and control the switching module to change the direction of voltage or current supplied to the MST antenna 397-1 according to the received signal. The change of the direction of the voltage or current allows the direction of the magnetic signal (e.g., a magnetic field) emitted from the MST antenna 397-1 to change accordingly. If detected at the external electronic device 102, the magnetic signal with its direction changing may cause an effect (e.g., a waveform) similar to that of a magnetic field that is generated when a magnetic card corresponding to the card information associated with the received signal is swiped through a card reader of the electronic device 102. According to an embodiment, for example, payment-related information and a control signal that are received by the electronic device 102 in the form of the magnetic signal may be further transmitted to an external server 108 (e.g., a payment server) via the network 199.

The NFC communication module 330 may obtain a signal containing control information or payment information such as card information from the processor 120 and transmit the obtained signal to the external electronic device 102 via the NFC antenna 397-3. According to an embodiment, the NFC communication module 330 may receive such a signal transmitted from the external electronic device 102 via the NFC antenna 397-3.

The wireless charging module 350 may wirelessly transmit power to the external electronic device 102 (e.g., a cellular phone or wearable device) via the wireless charging antenna 397-5, or wirelessly receive power from the external electronic device 102 (e.g., a wireless charging device). The wireless charging module 350 may support one or more of various wireless charging schemes including, for example, a magnetic resonance scheme or a magnetic induction scheme.

According to an embodiment, some of the MST antenna 397-1, the NFC antenna 397-3, or the wireless charging antenna 397-5 may share at least part of their radiators. For example, the radiator of the MST antenna 397-1 may be used as the radiator of the NFC antenna 397-3 or the wireless charging antenna 397-5, or vice versa. In such a case, the antenna module 197 may include a switching circuit (not shown) adapted to selectively connect (e.g., close) or disconnect (e.g. open) at least part of the antennas 397-1, 397-3, or 397-5, for example, under the control of the wireless communication module 192 (e.g., the MST communication module 310 or the NFC communication module 330) or the power management module (e.g., the wireless charging module 350). For example, when the electronic device 101 uses a wireless charging function, the NFC communication module 330 or the wireless charging module 350 may control the switching circuit to temporarily disconnect at least one portion of the radiators shared by the NFC antenna 397-3 and the wireless charging antenna 397-5 from the NFC antenna 397-3 and to connect the at least one portion of the radiators with the wireless charging antenna 397-5.

According to an embodiment, at least one function of the MST communication module 310, the NFC communication module 330, or the wireless charging module 350 may be controlled by an external processor (e.g., the processor 120). According to an embodiment, at least one specified function (e.g., a payment function) of the MST communication module 310 or the NFC communication module 330 may be performed in a trusted execution environment (TEE). According to an embodiment, the TEE may form an execution environment in which, for example, at least some designated area of the memory 130 is allocated to be used for performing a function (e.g., a financial transaction or personal information-related function) that requires a relatively high level of security. In such a case, access to the at least some designated area of the memory 130 may be restrictively permitted, for example, according to an entity accessing thereto or an application being executed in the TEE.

Figure 4A:
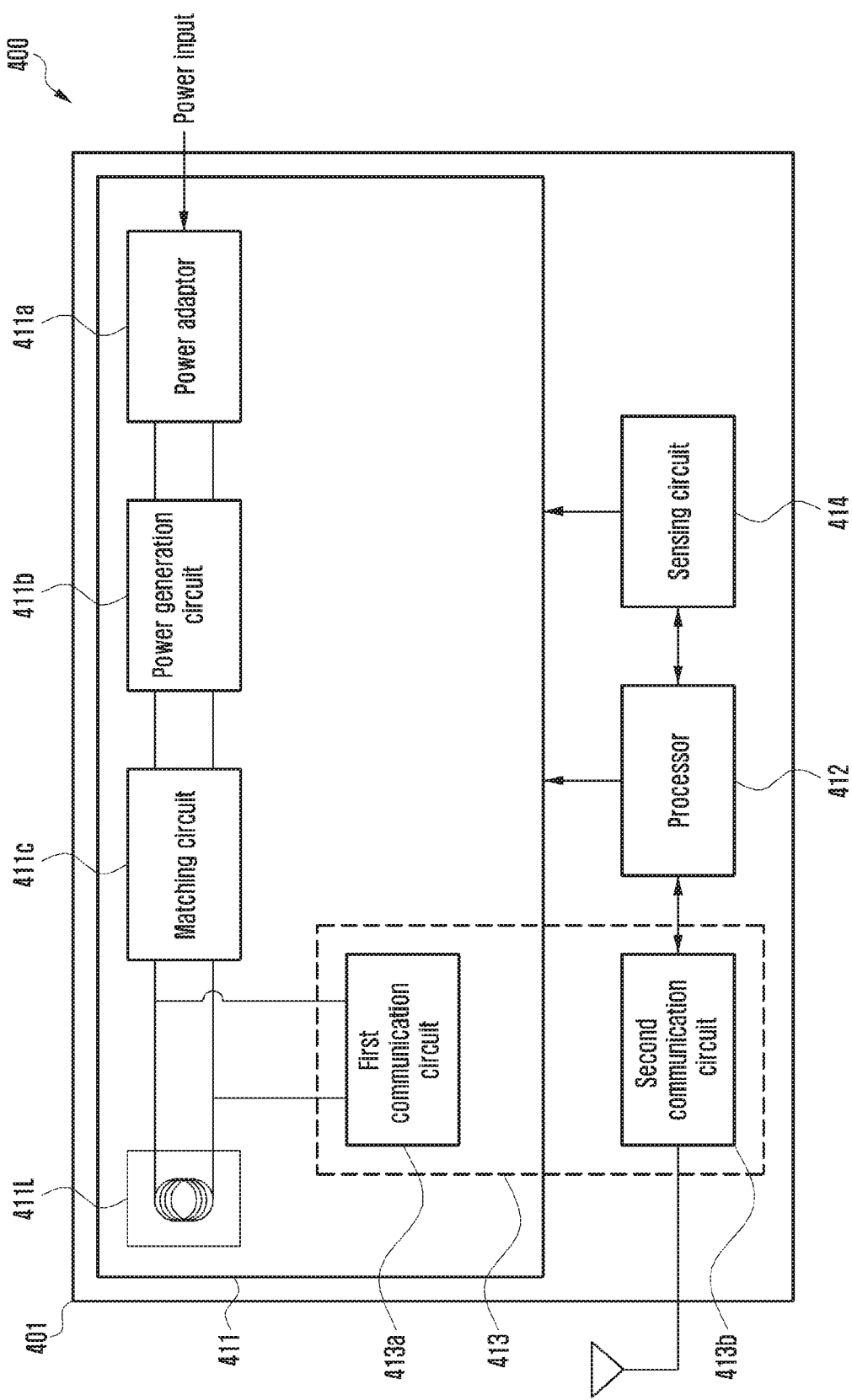
FIG. 4A is a block diagram illustrating an external electronic device according to various embodiments.

FIG. 4A is a block diagram 400 illustrating an external electronic device according to various embodiments.

Figure 4B:
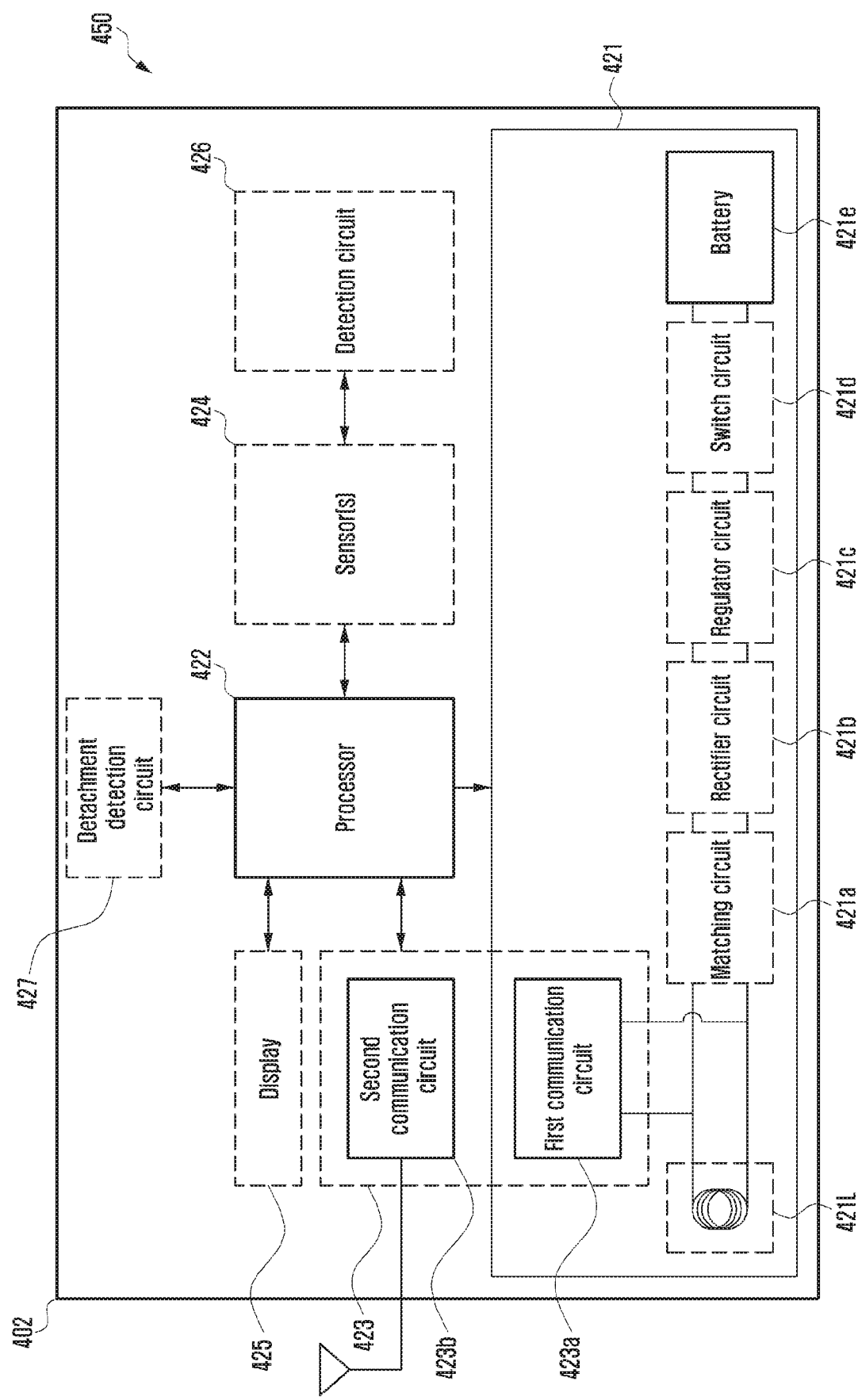
FIG. 4B is a block diagram illustrating an electronic device according to various embodiments.

FIG. 4B is a block diagram 450 illustrating an electronic device according to various embodiments.

Referring to FIGS. 4A and 4B, an external electronic device 401 (e.g. the electronic device 102 in FIG. 1) (hereinafter also called as a power transmission device) may wirelessly supply power to an electronic device 402 (e.g. the electronic device 101 in FIG. 1) (hereinafter also called as a power reception device), and the electronic device 402 may wirelessly receive power.

According to an embodiment, the power transmission device 401 may include a power transmission circuit 411, a processor 412, a communication circuit 413, and/or a sensing circuit 414.

According to an embodiment, the power transmission circuit 411 may include a power adaptor 411*a* configured to receive electric power (or power) input from an external source and convert voltage of the input electric power appropriately, and a power generation circuit 411*b* configured to generate power, and/or a matching circuit 411*c* configured to maximize transmission efficiency between a transmission coil 411L and a reception coil 421L.

According to an embodiment, the power transmission circuit 411 may include at least part of multiple power adaptors 411*a*, power generation circuits 411*b*, transmission coils 411L, or matching circuits 411*c* so as to transmit power to multiple power reception devices (for example, a first external electronic device and a second external electronic device).

According to an embodiment, by using the power generation circuit 411*b*, the power transmission circuit 411 may generate a first signal at a first frequency to provide first power to a first external electronic device, and a second signal at a second frequency to provide second power to a second external electronic device.

According to an embodiment, the processor 412 may generally control the power transmission device 401 and may generate various messages used for wireless power transmission and deliver the messages to the communication circuit 413. According to an embodiment, based on information received from the communication circuit 413, the processor 412 may calculate power (or an amount of power) to be transmitted to the power reception device 402. According to an embodiment, the processor 412 may control the power transmission circuit 411 such that the calculated power is transmitted to the power reception device 402 by the transmission coil 411L.

According to an embodiment, when power is transmitted to each of multiple power reception devices (for example, a first external electronic device and a second external electronic device), the processor 412 may perform control such that the power generation circuit 411*b* generates a first signal at a first frequency to provide first power to a first external electronic device, and a second signal at a second frequency to provide second power to a second external electronic device.

According to an embodiment, the communication circuit 413 may include at least one of a first communication circuit 413*a* and a second communication circuit 413*b*. The first communication circuit 413*a* may communicate with a first communication circuit 423*a* of the power reception device 402 by using, for example, a frequency band including the same frequency as used in the transmission coil 411L to deliver power or a frequency close thereto (e.g. an inband mode). The first communication circuit 413*a* may communicate by using, for example, the transmission coil 411L configured to deliver power generated by the power generation circuit 411*b* to the electronic device 402. According to an embodiment, the second communication circuit 413*b* may communicate with a second communication circuit 423*b* of the power reception device 402 by using, for example, a frequency band different from one including a frequency used in the transmission coil 411L to deliver power (e.g. an outband mode). For example, the second communication circuit 413*b* may use one of various short-range communication techniques, such as Bluetooth, BLE, Wi-Fi, and NFC. The processor 412 may acquire charging state-related information (e.g. Vrec information, Tout information, various packets, messages, etc.) from the communication circuit 413, 413*a*, or 413*b*. Based on the charging state-related information, the processor 412 may adjust power supplied to the power reception device 402.

According to an embodiment, the sensing circuit 414 may include at least one sensor and may sense at least one state of the power transmission device 401 by using the at least one sensor.

According to an embodiment, the sensing circuit 414 may include at least one of a temperature sensor, a motion sensor, or a current (or voltage) sensor, may sense a temperature state of the power transmission device 401 by using the temperature sensor, may sense a motion state of the power transmission device 401 by using the motion sensor, and may sense a state, for example current magnitude, voltage magnitude, or power magnitude, of an output signal of the power transmission device 401 by using the current (or voltage) sensor.

According to an embodiment, the current (or voltage) sensor may measure signals in the power transmission circuit 411. The current (or voltage) sensor may measure signals in at least certain area of the coil 411L, the matching circuit 411*c*, or the power generation circuit 411*b*. For example, the current (or voltage) sensor may include a circuit disposed at the front end of the coil 411L to measure signals.

According to an embodiment, the sensing circuit 414 may be a circuit for foreign object detection (FOD).

According to an embodiment, the processor 412 may transmit power for charging a battery 421*e* to the power reception device 402.

According to an embodiment, at least on the basis of status information related to an operation of charging the battery 421*e*, when a signal, corresponding to pausing power output, is received from the power reception device 402 to pause an operation of wirelessly outputting power, the processor 412 may pause the operation of outputting power.

According to an embodiment, the processor 412 may receive a signal, corresponding to resuming power output, from the power reception device 402 to resume the operation of wirelessly outputting power. In response to the reception of the signal corresponding to resuming power output, the processor 412 may wirelessly output power and transmit the same to the power reception device 402.

According to an embodiment, when no response signal in response to a checking signal sent to check the power reception device 402 is received in the predetermined number of attempts, the processor 412 may control the power transmission device 401 in a default state. According to an embodiment, the controlling in the default state may include an operation of performing reset such that the paused operation of outputting power is resumed.

According to an embodiment, the power reception device 402 (e.g. the electronic device 101 in FIG. 1) may include a power reception circuit 421, a processor 422 (e.g. the processor 120 in FIG. 1), a communication circuit 423 (e.g. the communication module 190 in FIG. 1), at least one sensor 424 (e.g. the sensor module 176 in FIG. 1), a display 425 (e.g. the display device 160 in FIG. 1), and/or a detection circuit 426. In relation to the power reception device 402, certain descriptions for configurations corresponding to the power transmission device 401 may be omitted.

According to an embodiment, the power reception circuit 421 may include a reception coil 421L configured to receive power wirelessly from the power transmission device 401, a matching circuit 421a, a rectifier circuit 421b configured to rectify received AC power to DC power, a regulator circuit 421c configured to regulate charging voltage, a switch circuit 421d, and/or a battery 421e (e.g. the battery 189 in FIG. 1). According to an embodiment, the power reception circuit 421 may be included in a reception circuit.

According to an embodiment, the communication circuit 423 may include at least one of a first communication circuit 423a and a second communication circuit 423b. The first communication circuit 423a may communicate with the power transmission device 401 through the reception coil 421L. The second communication circuit 423b may communicate with the power transmission device 401 by using one of various short-range communication techniques, such as Bluetooth, BLE, Wi-Fi, and NFC.

According to an embodiment, on receiving a signal or power transmitted from the power transmission device 401 through the coil 421L, the power reception device 402 may perform control such that the communication circuit 423 generates device information or power information of the power reception device 402 to transmit to the power transmission device 401. The generated power information may be delivered to the power transmission device 401 through the coil 421L. Otherwise, the generated power information may be delivered to the power transmission device 401 through a separate antenna. For example, the power information may be information (for example, a received power, voltage, or current state) related to charging power of the power reception device 402 or may include information on the output power, output voltage, or charging current of the power transmission device 401, or information associated therewith. For example, the power information may include information requesting a change in power to be transmitted by the power transmission device 401.

According to an embodiment, the power reception device 402 may charge the battery 421e through a charging circuit (e.g. the charging circuit 210 in FIG. 2) by using power received from the power transmission device 401 through the power reception circuit 421. When a magnetic field is formed around a coil (e.g. the transmission coil (Tx coil) 411L) of the power transmission device 401, a current flows through a coil (e.g. the reception coil (Rx coil) 421L) of the power reception device 402 due to electromagnetic induction or resonance, and the battery 421e can be thereby charged through the charging circuit. According to an embodiment, the detection circuit 426 may detect the power transmission device 401 by sensing a search signal or power received from the power transmission device 401. The detection circuit 426 may detect signal changes at the input/output terminal of the rectifier circuit 421b, or the coil 421L or the matching circuit 421a by using a signal of the coil 421L generated by a signal output from the power transmission device 401. According to an embodiment, the detection circuit 426 may be included in a reception circuit.

According to an embodiment, a detachment detection circuit 427 may detect whether the power reception device 402 is detached from the power transmission device 401. According to an embodiment, the detachment detection circuit 427 may be included in a reception circuit.

According to an embodiment, the display 425 may display various kinds of display information used for wireless power transmission/reception.

According to an embodiment, the at least one sensor 424 may include at least part of a current/voltage sensor, a temperature sensor, an illuminance sensor, or a sound sensor. The temperature sensor may measure the temperature of the battery 421e. According to an embodiment, the processor 422 may determine control of charging on the basis of changes over time in the temperature of the battery 421e or inside the power reception device 402, measured by the temperature sensor.

According to an embodiment, the detachment detection circuit 427 may detect whether the power transmission device 401 is detached.

According to an embodiment, the processor 422 may generally control the power reception device 402 and may generate various messages used for wireless power transmission and deliver the messages to the communication circuit 423.

According to an embodiment, the processor 422 may charge the battery 421e through a charging circuit (e.g. the charging circuit 210 in FIG. 2) by using power received through the power reception circuit 421 from the power transmission device 401. The processor 422 may obtain status information related to an operation of charging the battery 421e while the battery 421e is charged. For example, the status information related to the operation of charging the battery 421e may include at least one of information related to a fully-charged state of the battery 421e on the basis of the capacity of the battery 421e, information on whether the battery 421e is in an abnormal state, for example a swelling state, or information on whether the power reception device 402 is in an over-temperature state.

According to an embodiment, at least on the basis of the status information related to the operation of charging the battery 421e, the processor 422 may transmit a signal, corresponding to pausing power output, to the power transmission device 401 so that the power transmission device 401 pauses an operation of wirelessly outputting power. For example, when it is determined that the power reception device 402 is in at least one of a fully-charged state or a state where the temperature thereof is greater than or equal to a specified temperature, the processor 422 may perform control such that a signal corresponding to pausing power output is transmitted to the power transmission device 401 so that the power transmission device 401 pauses the operation of wirelessly outputting power.

According to an embodiment, the processor 422 may control the power reception circuit 421 so as to prevent the power reception circuit 421 from receiving power wirelessly output from the power transmission device 401 or may perform control so as to prevent at least part (for example, the communication circuit 423, the power reception circuit 421, etc.) of the internal elements of the power reception device 402 from responding to the signal received from the power transmission device 401.

According to an embodiment, in a state where power output of the power transmission device 401 is paused, the processor 422 may determine whether at least one of the following signals is detected: a signal for charging resumption or a signal related to a state as to whether the power reception device is detached from the power transmission device 401. For example, when the remaining level of the battery 421e measured a predetermined time period after the battery has reached a fully-charged state is lower than a predefined value, or when the temperature of the battery 421e is lower than a predefined value, the processor 422 may determine that the signal for charging resumption has been detected. However, the disclosure is not limited thereto.

According to an embodiment, in a state in which power output of the power transmission device 401 is paused, the processor 422 may check (for example, receive a signal (e.g. ping) related to a state as to whether detached or not) a state as to whether the power reception device is located sufficiently adjacent to the power transmission device 401 as to receive power from the power transmission device 401, and may check charging resumption conditions for the battery 421e. When the charging resumption conditions are satisfied (for example, when the remaining level of the battery 421e measured after a predetermined time period elapses is lower than a predefined value, or when the temperature of the battery 421e is lower than a predefined value), the processor 422 may perform control such that the battery 421e is charged through the charging circuit 210.

According to an embodiment, based on at least one of the signal for charging resumption for the battery 421e or the signal related to a state as to whether the power reception device 402 is detached from the power transmission device 401, the processor 422 may transmit a signal, corresponding to resuming power output, to the power transmission device 401 such that the power transmission device 401 resumes the operation of wirelessly outputting power. According to an embodiment, in response to the transmission of the signal corresponding to resuming power output, the processor 422 may receive power transmitted from the power transmission device 401.

According to an embodiment, based on at least one of the signal for charging resumption for the battery 421e or the signal as to whether the power reception device 402 is detached from the power transmission device 401, the processor 422 may perform control such that a response is made to the signal or power from the power transmission device 401, whereby the power transmission device 401 resumes the operation of wirelessly outputting power.

According to an embodiment, when detachment from the power transmission device 401 is detected by the detachment detection circuit 427, the processor 422 may receive a signal for a state of the detachment detection circuit 427 from the power reception circuit 421. For example, the signal for a state of the detachment detection circuit 427 may include a signal indicating that the detachment detection circuit 427 has been switched from a LOW state (e.g. an attached state) to a HIGH state (e.g. a state where the power reception device 402 has been detached from the power transmission device 401).

According to an embodiment, at least on the basis of the status information related to the operation of charging the battery 421e, the processor 422 may transmit a signal, corresponding to deactivating of the power reception circuit 421, to the power reception circuit 421. Otherwise, the deactivating of the power reception circuit 421 may include an operation of performing control such that no response signal in response to a checking signal received from the power transmission device 401 to check the power reception device 402 is transmitted to the power transmission device 401.

According to an embodiment, at least on the basis of the signal for charging resumption for the battery 421e or the signal as to whether the power reception device is detached from the power transmission device 401, the processor 422 may transmit, to the power reception circuit 421, a signal corresponding to activating of the power reception circuit 421. Otherwise, the activating of the power reception circuit 421 may include an operation of transmitting, to the power transmission device 401, a response signal in response to a power signal received from the power transmission device 401.

Figure 5:
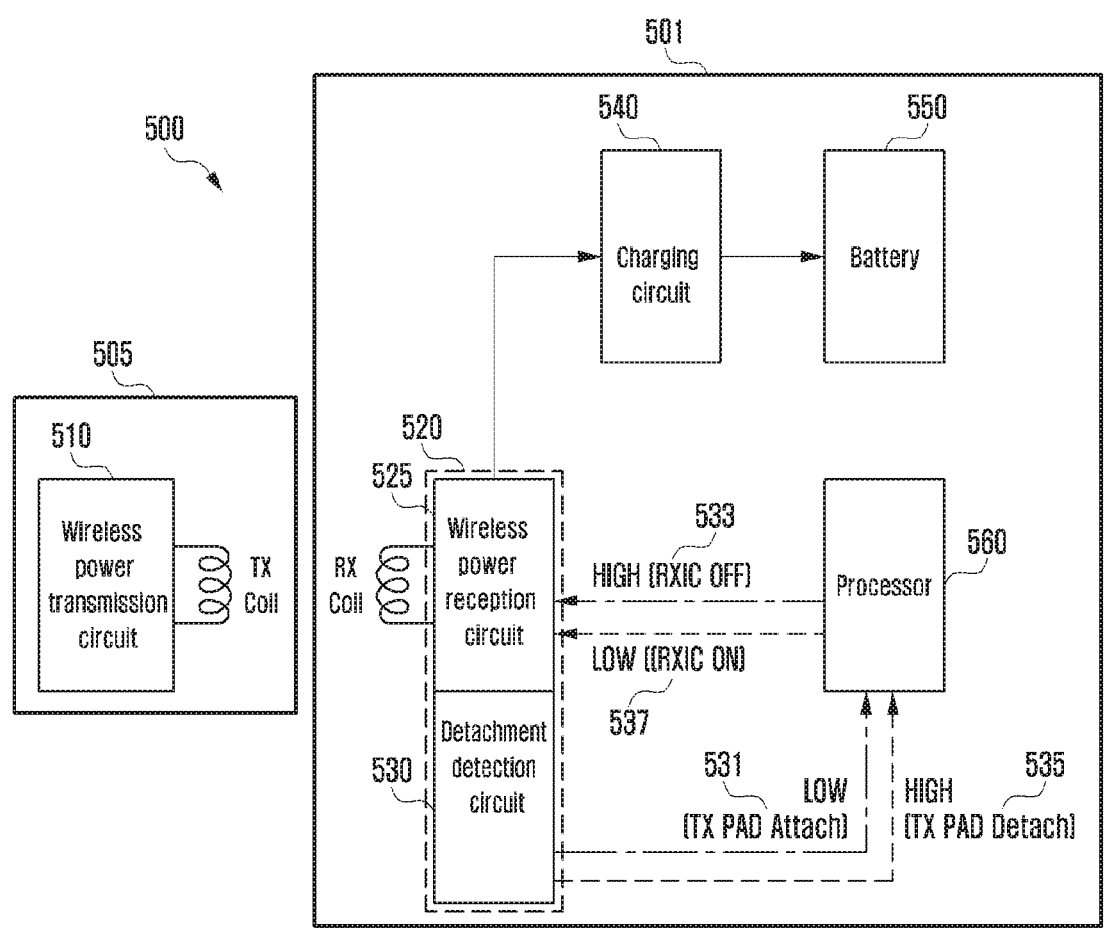
FIG. 5 is a diagram illustrating flows of signals during wireless charging of an electronic device according to various embodiments.

FIG. 5 is a diagram 500 illustrating flows of signals during wireless charging of an electronic device according to various embodiments.

Referring to FIG. 5, when attachment of an electronic device 501 (e.g. the electronic device 402 in FIG. 4B) to a charging device 505 (e.g. the external electronic device 401 in FIG. 4A) is detected, the charging device 505 may wirelessly provide power to the electronic device 501. For example, when a signal generated by a wireless power transmission circuit 510 (e.g. the power transmission circuit 411 in FIG. 4A) of the charging device 505 is applied to a transmission coil (e.g. a Tx coil) (e.g. the transmission coil 411L in FIG. 4A), an electromagnetic field may be formed around the transmission coil, and the charging device may transmit power generated by the electromagnetic field to a wireless power reception circuit 525 (e.g. the power reception circuit 421 in FIG. 4B) included in a reception circuit 520 of the electronic device 501. According to an embodiment, the wireless power reception circuit 525 may receive power transmitted from the charging device 505 and deliver the power to a charging circuit 540 (e.g. the charging circuit 210 in FIG. 2).

According to an embodiment, when power is applied to the wireless power reception circuit 525, a processor 560 or the wireless power reception circuit 525 may transmit an on-signal to the charging circuit 540. On receiving the on-signal, the charging circuit 540 may supply (or charge) a battery 550 (e.g. the battery 421e in FIG. 4B) with power transmitted from the charging device 505.

According to an embodiment, while the battery 550 is charged, the processor 560 may obtain status information related to an operation of charging the battery 550. For example, the processor may obtain at least one of information related to a swelling state of the battery 550, information related to a fully-charged state of the battery, or information related to an over-temperature state of the electronic device 501. When it is determined that the battery 550 is in a swelling state, in a fully-charged state, or in an over-temperature state, on the basis of at least one of the information related to a swelling state of the battery 550, the information related to a fully-charged state of the battery, or the information related to an over-temperature state of the electronic device 501, the processor 560 may transmit a signal, corresponding to pausing power transmission, to the charging device 505 through the wireless power reception circuit 525 such that the charging device 505 pauses an operation of wirelessly transmitting power.

According to an embodiment, in a state where power transmission is paused, the processor 560 may detect at least one of a signal for charging resumption or a signal as to whether the electronic device 501 is detached from the charging device 505. For example, the signal for charging resumption may include a signal that the remaining battery level measured a predetermined time period after the battery 550 has reached a fully-charged state is lower than a predefined value, or a signal that a temperature measured by a sensor circuit (e.g. the at least one sensor 424 in FIG. 4B) is lower than a predefined value.

According to an embodiment, depending on whether to detect a signal for power reception or charging resumption, the processor 560 may transmit, to the wireless power reception circuit 525, a signal 533 for performing control such that the wireless power reception circuit 525 is switched to HIGH, for example, the wireless power reception circuit 525 is switched off (e.g. disable), or a signal 537 for performing control such that the wireless power reception circuit 525 is switched to LOW, for example, switched on (e.g. enable). After the wireless power reception circuit 525 is switched from off to on in response to the received signals 533 and 537, the wireless power reception circuit 525 may transmit, to the charging device 505, a response signal in response to a signal (e.g. a ping signal) received from the wireless power transmission circuit 510 to detect wireless power reception circuits. According to an embodiment, in response to the transmission of the response signal, the wireless power reception circuit 525 may receive power from the wireless power transmission circuit 510 of the charging device 505 and charge the battery 550 through the charging circuit 540 by using the wirelessly received power.

According to an embodiment, depending on whether to detect a signal for power reception or charging resumption, the processor 560 may transmit, to the reception circuit 520, a signal 533 for performing control such that the reception circuit 520, for example the wireless power reception circuit 525 of the reception circuit 520, a communication circuit (e.g. the communication circuit 423 in FIG. 4B), or a connecting portion of a reception coil (Rx coil) is switched off (e.g. disable), or a signal 537 for performing control such that the reception circuit is switched on (e.g. enable).

According to an embodiment, a detachment detection circuit 530 included in the reception circuit 520 may detect whether the electronic device 501 is detached from the charging device 505. For example, when detachment of the electronic device 501 from the charging device 505 is detected, the processor 560 may receive, from the detachment detection circuit 530, state information of the detachment detection circuit 530, for example a HIGH signal 535. Otherwise, when a state of attachment of the electronic device to the charging device 505 is detected, the processor 560 may receive, from the detachment detection circuit 530, state information of the detachment detection circuit 530, for example a LOW signal 531. According to an embodiment, when the charging device 505 receives no response signal in the predetermined number of attempts after the electronic device 501 is detached, the charging device 505 may be controlled in a default state.

According to an embodiment, the wireless power reception circuit 520 and the detachment detection circuit 530 may be integrated into a single constituent element.

According to an embodiment, the detachment detection circuit 530 may be configured not to be turned to an off-state (e.g. a disabled state) under control of the processor 560.

Figure 6A:
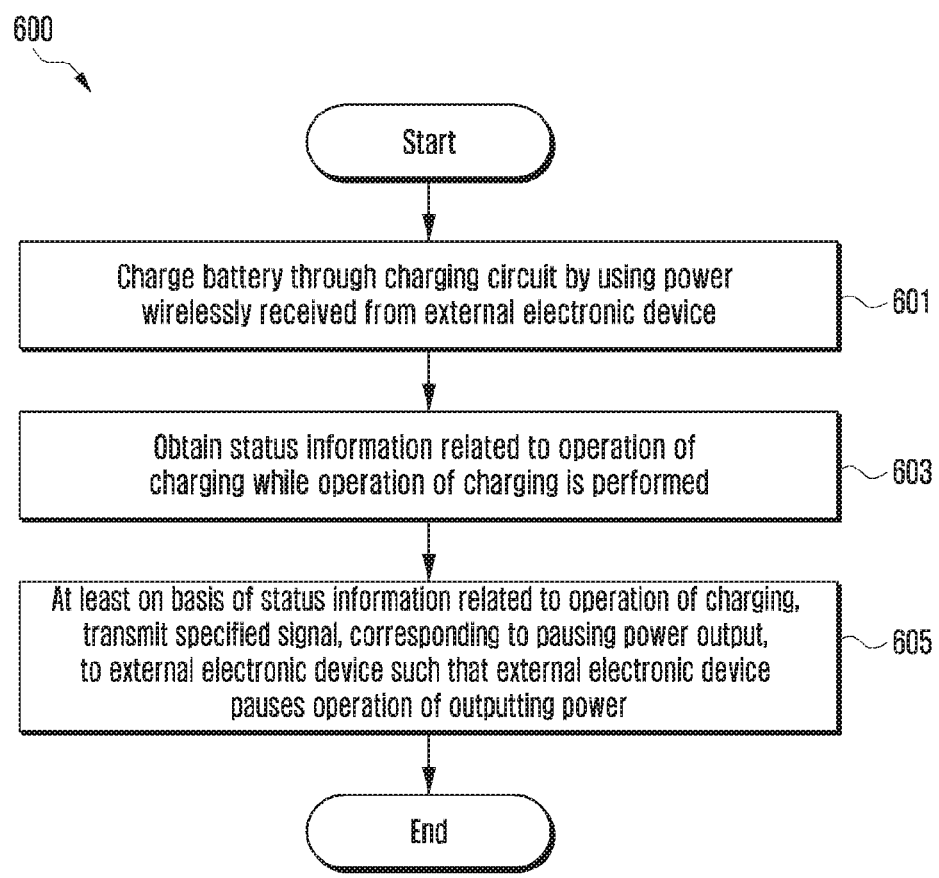
FIG. 6A is a flow chart illustrating a method for wirelessly charging an electronic device according to various embodiments.
Figure 6B:
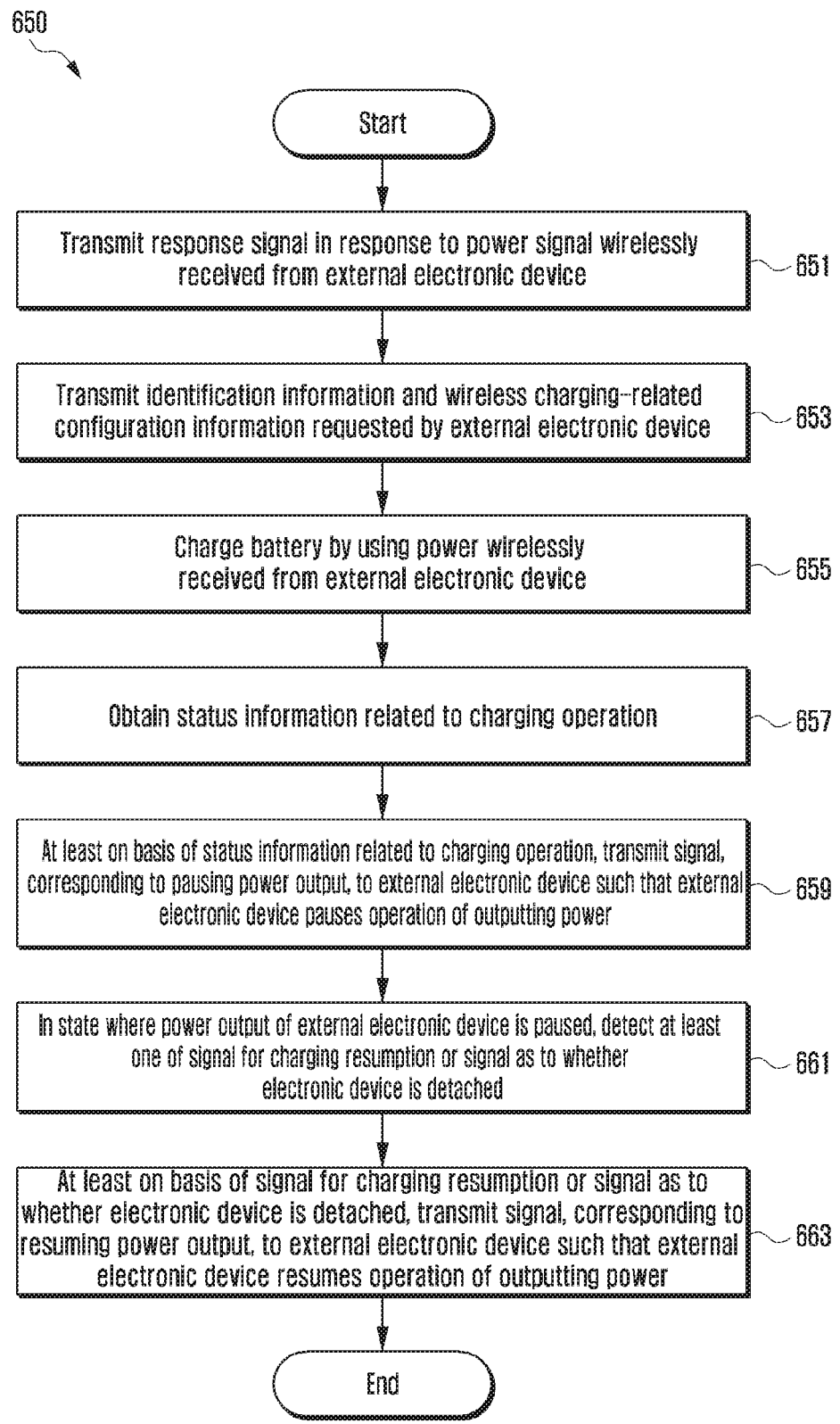
FIG. 6B is a flow chart illustrating a method for wirelessly charging an electronic device according to various embodiments.

FIG. 6A is a flow chart 600 illustrating a method for wirelessly charging an electronic device according to various embodiments, and FIG. 6B is a flow chart 650 illustrating a method for wirelessly charging an electronic device according to various embodiments.

Referring to FIG. 6A, according to an embodiment, a processor (e.g. the processor 422 in FIG. 4B), in operation 601, may charge a battery (e.g. the battery 421e in FIG. 4B) through a charging circuit (e.g. the charging circuit 540 in FIG. 5) by using power wirelessly received from an external electronic device (e.g. the external electronic device 401 in FIG. 4A).

According to an embodiment, the processor, in operation 603, may obtain status information related to the operation of charging while the operation of charging is performed. For example, the status information related to the operation of charging may include at least one of information related to a fully-charged state of the battery on the basis of the capacity of the battery, information on whether the battery is in an abnormal state, for example a swelling state, or information on whether an electronic device (e.g. the electronic device 402 in FIG. 4B) is in an over-temperature state.

According to an embodiment, in operation 605, at least on the basis of the status information related to the operation of charging, the processor may transmit a specified signal, corresponding to pausing power output, to the external electronic device such that the external electronic device pauses an operation of outputting power. For example, when at least one of a swelling state of the battery, a fully-charged state thereof, or an over-temperature state of the electronic device is detected, the processor may transmit a signal, corresponding to pausing power output, to the external electronic device such that the external electronic device pauses an operation of wirelessly outputting power.

The details of operations 601 to 605 according to an embodiment will be described in the section for operations 655 to 659 in FIG. 6B.

Referring to FIG. 6B, a processor (e.g. the processor 422 in FIG. 4B), in operation 651, may transmit, to an external electronic device (e.g. the external electronic device 401 in FIG. 4A), a response signal in response to a power signal wirelessly received from the external electronic device.

According to an embodiment, the power signal received from the external electronic device may include a signal (e.g. a ping signal) for detecting wireless power reception devices located within a predetermined range. For example, the power signal may include power for activating a wireless power reception circuit (e.g. the power reception circuit 421 in FIG. 4B) or at least one component included in the wireless power reception circuit.

According to an embodiment, a wireless power reception circuit of the electronic device may transmit, as a response signal in response to the power signal, the strength of the power signal to a wireless power transmission circuit (e.g. the power transmission circuit 411 in FIG. 4A) of the external electronic device. For example, the wireless power reception circuit may transmit, to the wireless power transmission circuit, a signal strength packet (SSP) including a message indicating the strength of a wireless power signal. For example, the strength of the power signal may indicate the degree of inductive coupling or the degree of resonant coupling for power transmission between the wireless power transmission circuit and the wireless power reception circuit. For example, when power received by the wireless power reception circuit is low, compared with power transmitted by the wireless power reception circuit, it may be determined that the degree of coupling thereto of the wireless power reception circuit is low. When no response to externally transmitted power signals is received, the wireless power transmission circuit may determine that a wireless power reception device has not been found, and may transmit a wireless power signal for detecting the wireless power reception device.

According to an embodiment, the processor may transmit the response signal to the external electronic device and then receive a request for identification information and charging-related configuration information of the electronic device from the external electronic device.

According to an embodiment, the processor, in operation 653, may transmit, to the external electronic device, at least one of the identification information and wireless charging-related configuration information requested by the external electronic device. For example, the identification information may include version information, a product code, a device identifier, etc. The configuration information may include a wireless charging frequency, maximum chargeable power, a power amount requested for charging, average transmission power amount, transmission voltage, transmission current, or the like.

According to an embodiment, as an operation not illustrated, the processor may receive identification information of the external electronic device from the external electronic device, in operation 653.

According to an embodiment, the processor, in operation 655, may charge a battery (e.g. the battery 421e in FIG. 4B) through a charging circuit (e.g. the charging circuit 210 in FIG. 2) by using power wirelessly receive from the external electronic device.

According to an embodiment, the processor may control a display (e.g. the display 425 in FIG. 4B) such that information related to charging of the battery is displayed. According to an embodiment, the external electronic device may allow an indicator (e.g. an indicator separately provided in the external electronic device, or an LED (e.g. a notification LED) disposed in the front side of the electronic device) to emit light on the basis of light emission characteristics indicating a charging state.

According to an embodiment, the processor, in operation 657, may obtain status information related to the operation of charging the battery while the battery is charged by the use of received power.

According to an embodiment, the processor may measure state information of the battery at predetermined time intervals. For example, the state information of the battery may be measured by a power gauge (e.g. the power gauge 230 in FIG. 2) connected to the battery. The state information of the battery may include the capacity of the battery, the number of charging/discharging cycles, the voltage, or the temperature.

According to an embodiment, based on the state information of the battery, the processor may obtain status information related to the operation of charging. For example, the processor may determine based on the capacity of the battery whether the battery is in a fully-charged state, may determine based on the temperature or pressure of the battery whether the battery is in an abnormal state, for example a swelling state, or may determine whether the electronic device is in an over-temperature state.

According to an embodiment, based on temperature information measured by a sensor circuit (e.g. the at least one sensor 424 in FIG. 4A), the processor may determine whether the electronic device is in an over-temperature state.

According to an embodiment, the processor may control wireless charging, based on the state information of the battery or the over-temperature state of the electronic device.

Embodiments will be hereinafter described as if the status information related to the operation of charging includes at least one of a swelling state of the battery, a fully-charged state of the battery, or an over-temperature state of the electronic device.

According to an embodiment, at least on the basis of the status information, the processor, in operation 659, may transmit a signal, corresponding to pausing power output, to the external electronic device such that the external electronic device pauses an operation of wirelessly outputting power. For example, when at least one of a swelling state of the battery, a fully-charged state thereof, or an over-temperature state of the electronic device is detected, the processor may transmit a signal, corresponding to pausing power output, to the external electronic device such that the external electronic device pauses an operation of wirelessly outputting power.

According to an embodiment, the processor may transmit the signal, corresponding to pausing power output, to the external electronic device through the wireless power reception circuit or a wireless communication circuit (e.g. the communication circuit 423 in FIG. 4B).

According to an embodiment, the processor may control the display such that information related to the pausing of charging is displayed. According to an embodiment, the external electronic device may allow a separately provided indicator to emit light on the basis of light emission characteristics indicating a power output-paused state.

According to an embodiment, in a state where power output of the external electronic device is paused, the processor, in operation 661, may detect at least one of a signal for charging resumption or a signal as to whether the electronic device is detached from the external electronic device.

According to an embodiment, the signal for charging resumption may include a signal that the remaining battery level measured a predetermined time period after the battery has reached a fully-charged state is lower than a predefined value, or a signal that a temperature measured by the sensor circuit is lower than a predefined value. However, the disclosure is not limited thereto.

According to an embodiment, the processor may detect, through a detachment detection circuit (e.g. the detachment detection circuit 530 in FIG. 5), whether the electronic device is detached from the external electronic device.

According to an embodiment, based on at least one of the signal for charging resumption or the signal as to whether the electronic device is detached from the external electronic device, the processor, in operation 663, may transmit a signal, corresponding to resuming power output, to the external electronic device such that the external electronic device resumes the operation of wirelessly outputting power. For example, when the remaining level of the battery is lower than a predefined value and the electronic device is not detached from the external electronic device (e.g. an attached state), the processor may transmit the signal, corresponding to resuming power output, to the external electronic device such that the external electronic device resumes the operation of wirelessly outputting power.

According to an embodiment, in a state where power output of the external electronic device is paused, the processor may check (for example, receive a signal (e.g. a ping signal) related to a state as to whether detached or not) a state as to whether the electronic device is located sufficiently adjacent to the external electronic device as to receive power from the external electronic device. When charging resumption conditions is checked and the charging resumption conditions are satisfied (for example, when the remaining level of the battery measured after a predetermined time period elapses is lower than a predefined value, or when the temperature of the battery is lower than a predefined value), the processor may transmit the signal, corresponding to resuming power output, to the external electronic device such that the external electronic device resumes the operation of wirelessly outputting power.

According to an embodiment, based on at least one of the signal for charging resumption for the battery or the signal as to whether the electronic device is detached from the external electronic device, the processor may perform control so as to respond to a signal or power from the external electronic device such that the external electronic device resumes the operation of wirelessly outputting power.

According to an embodiment, the processor may transmit the signal, corresponding to resuming power output, to the external electronic device through the wireless power reception circuit or the wireless communication circuit.

According to an embodiment, in response to the transmission of the signal corresponding to resuming power output, the processor may receive power output from the external electronic device. For example, in response to the transmission of the signal corresponding to resuming power output, the processor may perform operations 651 to 655 described above to receive power output wirelessly from the external electronic device, and may recharge the battery through the charging circuit by using the power.

According to an embodiment, the processor may control the display such that information related to the resumption of charging is displayed. According to an embodiment, the external electronic device may allow a separately provided indicator to emit light on the basis of light emission characteristics indicating a power output-resumed state.

The above-described charging operation for the electronic device, performed when the remaining level of the battery is lower than a predefined value or the temperature of the electronic device or battery is lower than a predefined value and when the electronic device is not detached from the external electronic device, will be further described below in the section for FIG. 7.

According to an embodiment, as an operation not illustrated, when detachment from the external electronic device is detected through the detachment detection circuit, the processor may receive, from the detachment detection circuit, a signal for a state of the detachment detection circuit, for example a signal obtained when the detachment detection circuit has been switched from a LOW state (e.g. a state where the electronic device is attached to the external electronic device) to a HIGH state (e.g. a state where the electronic device is detached from the external electronic device).

According to an embodiment, when the electronic device is detached from the external electronic device, the processor may perform control so as to prevent the display from displaying information related to wireless charging. According to an embodiment, when the electronic device is detached therefrom, the external electronic device may perform control so as to prevent the separately provided indicator from emitting light.

The above-described operations, performed when the electronic device is detached from the external electronic device, will be further described below in the section for FIG. 8.

According to an embodiment, in operation 659 described above, a signal for pausing power output of the charging device is transmitted to the charging device when it is determined that the battery is in a fully-charged state or is in an abnormal state or the electronic device is in an over-temperature state, and thus the electronic device can pause an operation of charging the battery of the electronic device in situations dangerous or requiring no longer charging operation. Accordingly, not only can an electronic device be protected but also a degree to which the electronic device heats up can be reduced.

Figure 7:
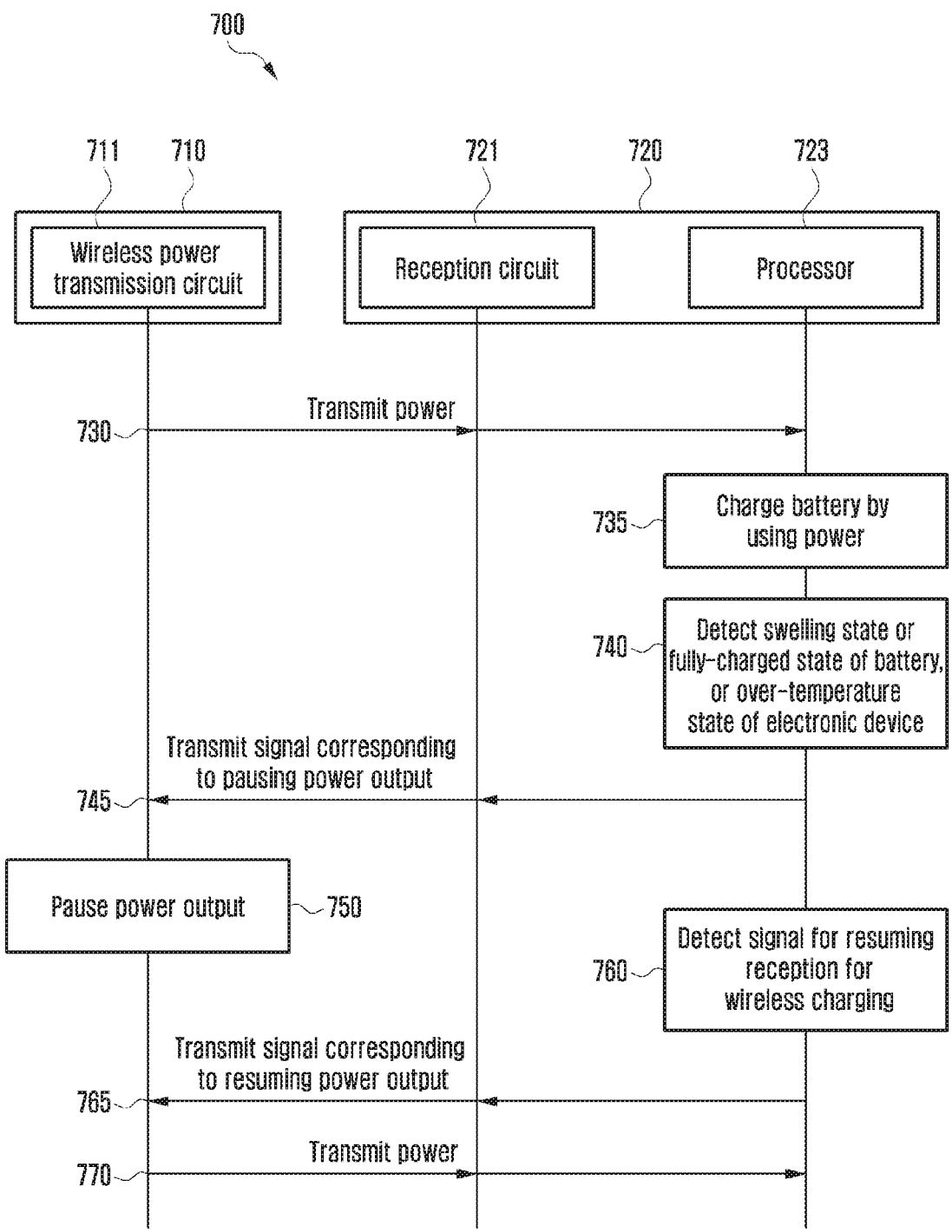
FIG. 7 is a diagram illustrating flows for wireless charging between an electronic device and an external electronic device according to various embodiments.

FIG. 7 is a diagram 700 illustrating flows for wireless charging between an electronic device and an external electronic device according to various embodiments.

Referring to FIG. 7, a wireless power transmission circuit 711 (e.g. the power transmission circuit 411 in FIG. 4A) of an external electronic device 710 (e.g. the external electronic device 401 in FIG. 4A), in operation 730, may wirelessly transmit power to a processor 723 (e.g. the processor 422 in FIG. 4B) through a reception circuit 721 of an electronic device 720 (e.g. the electronic device 402 in FIG. 4B). According to an embodiment, the reception circuit 721 may include a communication circuit (e.g. the communication circuit 423 in FIG. 4B), a wireless power reception circuit (e.g. the power reception circuit 421 in FIG. 4B), or a detachment detection circuit (e.g. the detachment detection circuit 427 in FIG. 4B).

According to an embodiment, as operations not illustrated in FIG. 7, operations 651 and 653 in FIG. 6B may be performed between the external electronic device 710 and the electronic device 720 before operation 730 of transmitting power.

According to an embodiment, the processor 723, in operation 735, may perform control such that the reception circuit 721 or a charging circuit (e.g. the charging circuit 540 in FIG. 5) charges a battery (e.g. the battery 421e in FIG. 4B) by using power received from the external electronic device 710.

According to an embodiment, the processor 723, in operation 740, may detect a swelling state of the battery, a fully-charged state of the battery, or an over-temperature state of the electronic device. When at least one of the swelling state of the battery, the fully-charged state of the battery, or the over-temperature state of the electronic device is detected, the processor 723, in operation 745, may transmit a signal, corresponding to pausing power output, to the wireless power transmission circuit 711 of the external electronic device 710 through the reception circuit 721.

According to an embodiment, the wireless power transmission circuit 711 of the external electronic device 710, in operation 750, may pause an operation of outputting power to the processor 723 in response to the signal corresponding to pausing power output.

According to an embodiment, as an operation not illustrated, the wireless power transmission circuit 711 of the external electronic device 710, only pausing the operation of outputting power, may perform an operation of transmitting at predetermined time intervals a signal (e.g. a ping signal) for detecting wireless power reception devices located within a predetermined range.

According to an embodiment, the processor 723, in operation 760, may detect a signal for wireless charging resumption.

According to an embodiment, the signal for wireless charging resumption may include at least one of a signal that the remaining battery level measured a predetermined time period after the battery has reached a fully-charged state is lower than a predefined value, or a signal that the temperature of the electronic device or battery is lower than a predefined value. For example, the processor 723 may measure the remaining level of the battery or the temperature of the battery at predetermined time intervals by using a sensor circuit (e.g. the at least one sensor 424 in FIG. 4A) or a power gauge (e.g. the power gauge 230 in FIG. 2) connected to the battery. Based on the measured remaining level or temperature of the battery, the processor 723 may determine whether the signal for wireless charging resumption is detected. According to an embodiment, based on temperature information measured by a sensor circuit (e.g. the at least one sensor 424 in FIG. 4A), the processor 723 may determine whether the electronic device is in an over-temperature state.

According to an embodiment, when the signal for wireless charging resumption is detected, the processor 723, in operation 765, may transmit a signal, corresponding to resuming power output, to the wireless power transmission circuit 711 of the external electronic device 710 through the reception circuit 721.

According to an embodiment, the signal corresponding to resuming power output may include signals for disabling and then enabling the wireless power reception circuit included in the reception circuit 721. For example, the processor 723 may transmit, to the reception circuit 721, a signal for disabling the wireless power reception circuit and a signal for enabling the wireless power reception circuit. After disabling and then enabling the wireless power reception circuit in response to the signal received from the processor 723, the reception circuit 721 may transmit, to the wireless power transmission circuit 711, a response signal in response to a signal (e.g. a ping signal) received from the wireless power transmission circuit 711 to detect wireless power reception devices.

According to an embodiment, on receiving the signal corresponding to resuming power output, the wireless power transmission circuit 711 of the external electronic device 710, in operation 770, may transmit power to the processor 723 through the reception circuit 721 of the electronic device 720.

According to an embodiment, as an operation not illustrated, the external electronic device 710 may be controlled in a default state when no response signal in response to the signal (e.g. a ping signal) for detecting wireless power reception devices is received in the predetermined number of attempts. For example, because outputting power has been paused since operation 750, the controlling in the default state may include an operation of performing reset such that the operation of outputting power can be performed again.

According to an embodiment, the processor 723 may transmit, to the reception circuit 721, a signal for enabling the wireless power reception circuit included in the reception circuit 721. According to an embodiment, in response to the enabling signal, the reception circuit 721 may transmit a response signal in response to a ping signal transmitted from the wireless power transmission circuit 711. In response to the transmission of the response signal, the reception circuit 721 may receive power wirelessly transmitted from the wireless power transmission circuit 711.

According to an embodiment, as an operation not illustrated, the processor 723 may perform control such that the wireless power reception circuit included in the reception circuit 721 is disabled, and then may receive a signal indicating a detachment state from the external electronic device 710. When the electronic device 720 is detached from the external electronic device 710, the wireless power transmission circuit 711 may not receive any response signal in response to a transmitted signal (e.g. a ping signal) for detecting wireless power reception devices. According to an embodiment, when no response signal is received in the predetermined number of attempts, the external electronic device 710 may be controlled in a default state. For example, because outputting power has been paused since operation 750, the controlling in the default state may include an operation of performing reset such that the operation of outputting power can be performed again. According to an embodiment, the processor 723 may transmit a signal for enabling the wireless power reception circuit included in the reception circuit 721 to the wireless power reception circuit 721.

Figure 8:
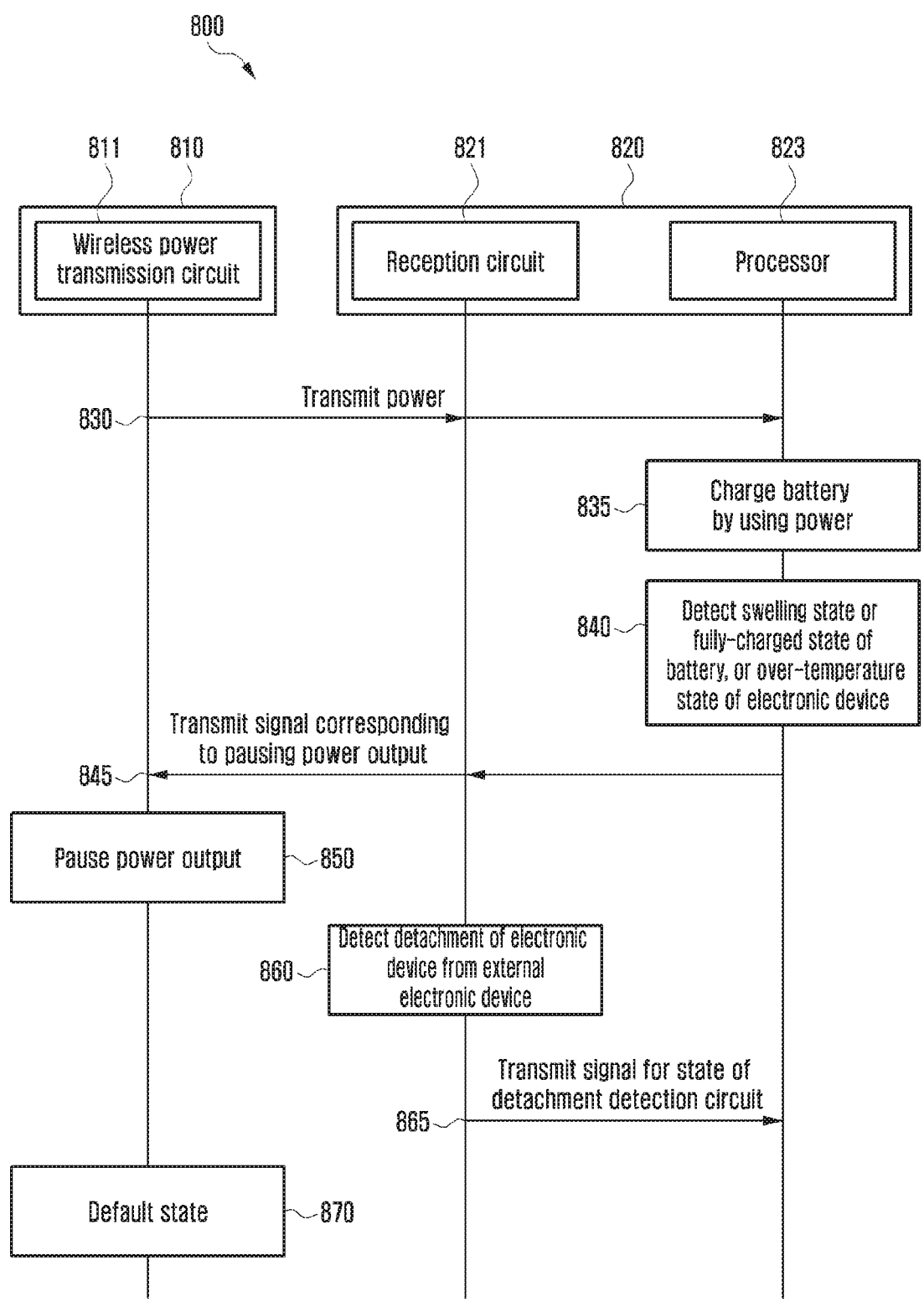
FIG. 8 is a diagram illustrating flows for wireless charging between an electronic device and an external electronic device according to various embodiments.

FIG. 8 is a diagram 800 illustrating flows for wireless charging between an electronic device and an external electronic device according to various embodiments.

Since operations 830 to 850 in FIG. 8 according to an embodiment are the same as operations 730 to 750 in FIG. 7, the descriptions thereof will be omitted.

Referring to FIG. 8, a reception circuit 821, in operation 860, may detect detachment of an electronic device 820 (e.g. the electronic device 402 in FIG. 4B) from an external electronic device 810 (e.g. the external electronic device 401 in FIG. 4A). For example, the detachment from the external electronic device 810 may be detected through a detachment detection circuit (e.g. the detachment detection circuit 427 in FIG. 4B) included in the reception circuit 821.

According to an embodiment, on detecting detachment from the external electronic device 810, the reception circuit 821, in operation 865, may transmit a signal for a state of the detachment detection circuit to a processor 823 (e.g. the processor 422 in FIG. 4B). For example, the signal for a state of the detachment detection circuit may include a signal indicating that the detachment detection circuit has been switched from a LOW state (e.g. a state where the electronic device 820 has been attached to the external electronic device 810) to a HIGH state (e.g. a state where the electronic device 820 has been detached from the external electronic device 810).

According to an embodiment, when the signal for a state of the detachment detection circuit is received, the processor 823 may perform control so as to prevent a display (e.g. the display 425 in FIG. 4B) from displaying information related to wireless charging.

According to an embodiment, as an operation not illustrated, in a state where outputting power is paused, the wireless power transmission circuit 811 (e.g. the power transmission circuit 411 in FIG. 4A) of the external electronic device 810 may transmit a signal (e.g. a ping signal) for detecting wireless power reception devices located within a predetermined range to the processor 823 at predetermined time intervals.

According to an embodiment, when the electronic device 820 is detached from the external electronic device 810, the external electronic device 810 may not receive any response signal in response to the ping signal. When the response signal is not received in the predetermined number of attempts, the external electronic device 810, in operation 870, may control the wireless power transmission circuit 811 in a default state. According to an embodiment, because outputting power has been paused, the controlling in the default state may include an operation of performing reset such that the operation of outputting power can be performed again.

According to an embodiment, when attachment of the electronic device 820 to the external electronic device 810 is detected after the reset is performed, the processor 823 may receive power wirelessly output from the external electronic device 810 in operation 830.

Figure 9:
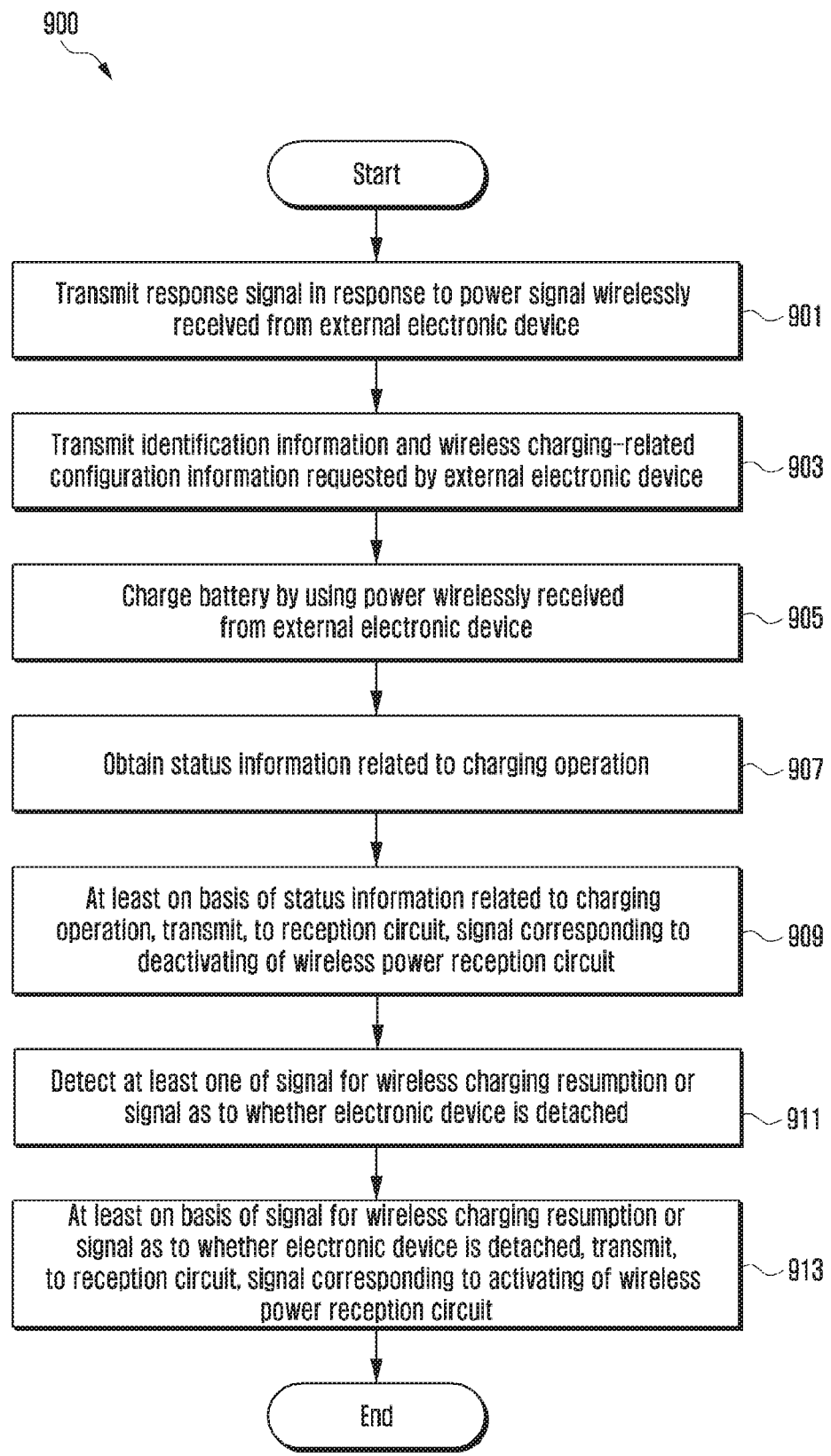
FIG. 9 is a flowchart illustrating a method for wirelessly charging an electronic device according to various embodiments.

FIG. 9 is a flowchart 900 illustrating a method for wirelessly charging an electronic device according to various embodiments.

Referring to FIG. 9, a processor (e.g. the processor 422 in FIG. 4B), in operation 901, may transmit, to an external electronic device (e.g. the external electronic device 401 in FIG. 4A), a response signal in response to a power signal wirelessly received from the external electronic device.

According to an embodiment, the processor, in operation 903, may transmit, to the external electronic device, at least one of the identification information and wireless charging-related configuration information requested by the external electronic device.

According to an embodiment, the processor, in operation 905, may charge a battery (e.g. the battery 421*e* in FIG. 4B)

through a charging circuit (e.g. the charging circuit 540 in FIG. 5) by using power wirelessly receive from the external electronic device.

According to an embodiment, the processor, in operation 907, may obtain status information related to the operation of charging.

Since operations 901 to 907 are the same as operations 651 to 657 in FIG. 6B described above, the details thereof will be omitted.

According to an embodiment, at least on the basis of the status information related to the operation of charging, the processor, in operation 909, may transmit a signal, corresponding to deactivating of a wireless power reception circuit (e.g. the power reception circuit 421 in FIG. 4B), to a reception circuit (or the wireless power reception circuit included in the reception circuit). For example, when the status information related to the operation of charging, for example at least one of a swelling state of the battery, a fully-charged state of the battery, or an over-temperature state of the electronic device is detected, the processor may transmit the signal, corresponding to deactivating of the wireless power reception circuit, to the reception circuit (or the wireless power reception circuit included in the reception circuit). According to an embodiment, the deactivating of the wireless power reception circuit may be an operation for performing control such that no response signal in response to a checking signal received from the external electronic device to check the electronic device is transmitted to the external electronic device.

According to an embodiment, as an operation not illustrated, a wireless power transmission circuit (e.g. the power transmission circuit 411 in FIG. 4A) of the external electronic device may perform an operation of outputting power or an operation of transmitting at predetermined time intervals a signal (e.g. a ping signal) for detecting power reception devices located within a predetermined range. When deactivated, the wireless power reception circuit may not transmit, to the wireless power transmission circuit of the external electronic device, any response signal in response to a ping signal received from the external electronic device. In addition, when the wireless power reception circuit is deactivated, power output from the wireless power transmission circuit of the external electronic device may be unreceivable, and thereby an operation of charging the battery through the charging circuit may be paused. According to an embodiment, the electronic device may perform an operation of disabling a coil (e.g. the transmission coil 411L in FIG. 4A or the reception coil 421L in FIG. 4B) such that no power is generated in the reception circuit. Since the electronic device may be unable to receive power, the operation of charging the battery through the charging circuit may be paused. When the wireless power reception circuit is deactivated, no response signal in response to a ping signal received from the external electronic device may be transmitted to the wireless power transmission circuit of the external electronic device.

According to an embodiment, the processor, in operation 911, may detect at least one of a signal for wireless charging resumption or a signal as to whether the electronic device is detached from the external electronic device. For example, the signal for wireless charging resumption may include a signal that the remaining battery level measured a predetermined time period after the battery has reached a fully-charged state is lower than a predefined value, or a signal that the temperature of the electronic device or battery is lower than a predefined value. However, the disclosure is not limited thereto.

According to an embodiment, the processor may detect, through a detachment detection circuit (e.g. the detachment detection circuit 427 in FIG. 4B), whether the electronic device is detached from the external electronic device.

According to an embodiment, based on the signal for wireless charging resumption or the signal as to whether the electronic device is detached from the external electronic device, the processor, in operation 913, may transmit a signal, corresponding to activating of the wireless power reception circuit, to the reception circuit (or the wireless power reception circuit included in the reception circuit). For example, when the remaining level of the battery is lower than a predefined value, the temperature of the electronic device or battery is lower than a predefined value, and the electronic device is not detached from the external electronic device, the processor may transmit a signal, corresponding to activating of the wireless power reception circuit, to the reception circuit (or the wireless power reception circuit included in the reception circuit). According to an embodiment, the activating of the wireless power reception circuit may be an operation for performing control such that a response signal in response to a power signal wirelessly received from the external electronic device is transmitted to the external electronic device. For example, after transmitting a response signal in response to a ping signal received from the external electronic device, the wireless power reception circuit may receive power from the external electronic device and may charge the battery by using the power.

The above-described wireless charging operation for the electronic device, performed when the remaining level of the battery is lower than a predefined value, the temperature of the electronic device or battery is lower than a predefined value, and the electronic device is not detached from the external electronic device, will be further described below in the section for FIG. 10.

According to an embodiment, as an operation not illustrated, when detachment of the electronic device from the external electronic device is detected, the processor may receive, from the wireless power reception circuit, a signal for a state of the detachment detection circuit. For example, the signal for a state of the detachment detection circuit may include a signal indicating that the detachment detection circuit is switched from a LOW state to a HIGH state.

The above-described operations, performed when the electronic device is detached from the external electronic device, will be further described below in the section for FIG. 11.

According to an embodiment, in operation 909 described above, the wireless power reception circuit can be deactivated when it is determined that the battery is in a fully-charged state or is in an abnormal state or the electronic device is in an over-temperature state, and thus an operation of charging the battery of the electronic device can be paused in situations dangerous or requiring no longer wireless charging operation. Accordingly, in situations requiring no longer the wireless charging operation, charging for an electronic device can be paused, and thus the efficiency of charging can be improved.

Figure 10:
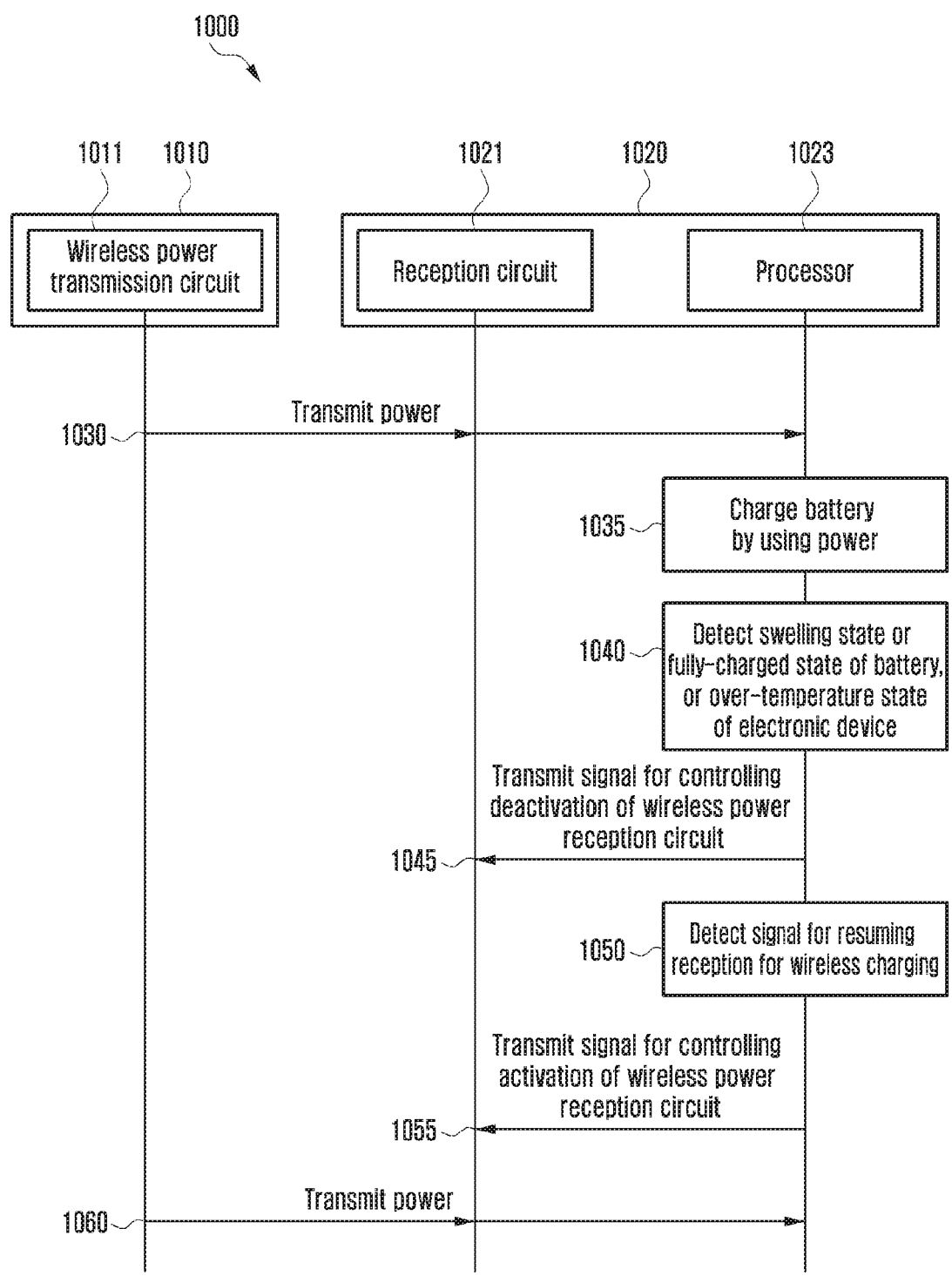
FIG. 10 is a diagram illustrating flows for wireless charging between an electronic device and an external electronic device according to various embodiments.

FIG. 10 is a diagram 1000 illustrating flows for wireless charging between an electronic device and an external electronic device according to various embodiments.

Since operations 1030 to 1040 in FIG. 10 according to an embodiment are the same as operations 730 to 740 in FIG. 7, the descriptions thereof will be omitted.

Referring to FIG. 10, when a swelling state of a battery (e.g. the battery 421e in FIG. 4B), a fully-charged state thereof, or an over-temperature state of an electronic device is detected in operation 1040, a processor 1023 (e.g. the processor 422 in FIG. 4B), in operation 1045, may transmit, to a reception circuit 1021, a signal for controlling deactivation of a wireless power reception circuit (e.g. the power reception circuit 421 in FIG. 4B) included in the reception circuit 1021.

According to an embodiment, the wireless power reception circuit may be deactivated under control of the processor 1023.

According to an embodiment, as an operation not illustrated, a wireless power transmission circuit 1011 (e.g. the power transmission circuit 411 in FIG. 4A) of an external electronic device 1010 (e.g. the external electronic device 401 in FIG. 4A) may transmit a signal (e.g. a ping signal) for detecting wireless power reception devices located within a predetermined range at predetermined time intervals.

According to an embodiment, when the wireless power reception circuit is deactivated, the reception circuit 1021 may not respond to a ping signal received from the wireless power transmission circuit 1011.

According to an embodiment, the processor 1023, in operation 1050, may detect a signal for resuming wireless charging. For example, the signal for resuming wireless charging may include at least one of a signal that the remaining battery level measured a predetermined time period after the battery has reached a fully-charged state is lower than a predefined value, or a signal that the temperature of the electronic device or battery is lower than a predefined value.

According to an embodiment, when a signal for resuming wireless charging is detected, the processor 1023, in operation 1055, may transmit, to the reception circuit 1021, a signal for controlling activation of the wireless power reception circuit included in the reception circuit 1021.

According to an embodiment, the wireless power reception circuit may be activated under control of the processor 1023. When activated, the wireless power reception circuit may transmit, to the wireless power transmission circuit 1011, a response signal in response to a ping signal received from the wireless power transmission circuit 1011.

According to an embodiment, when the response signal is received, the wireless power transmission circuit 1011 of the external electronic device 1010, in operation 1060, may transmit power to the processor 1023 through the reception circuit 1021 of an electronic device 1020 (e.g. the electronic device 402 in FIG. 4B). The processor 1023 may charge the battery through a charging circuit (e.g. the charging circuit 540 in FIG. 5) by using the power.

Figure 11:
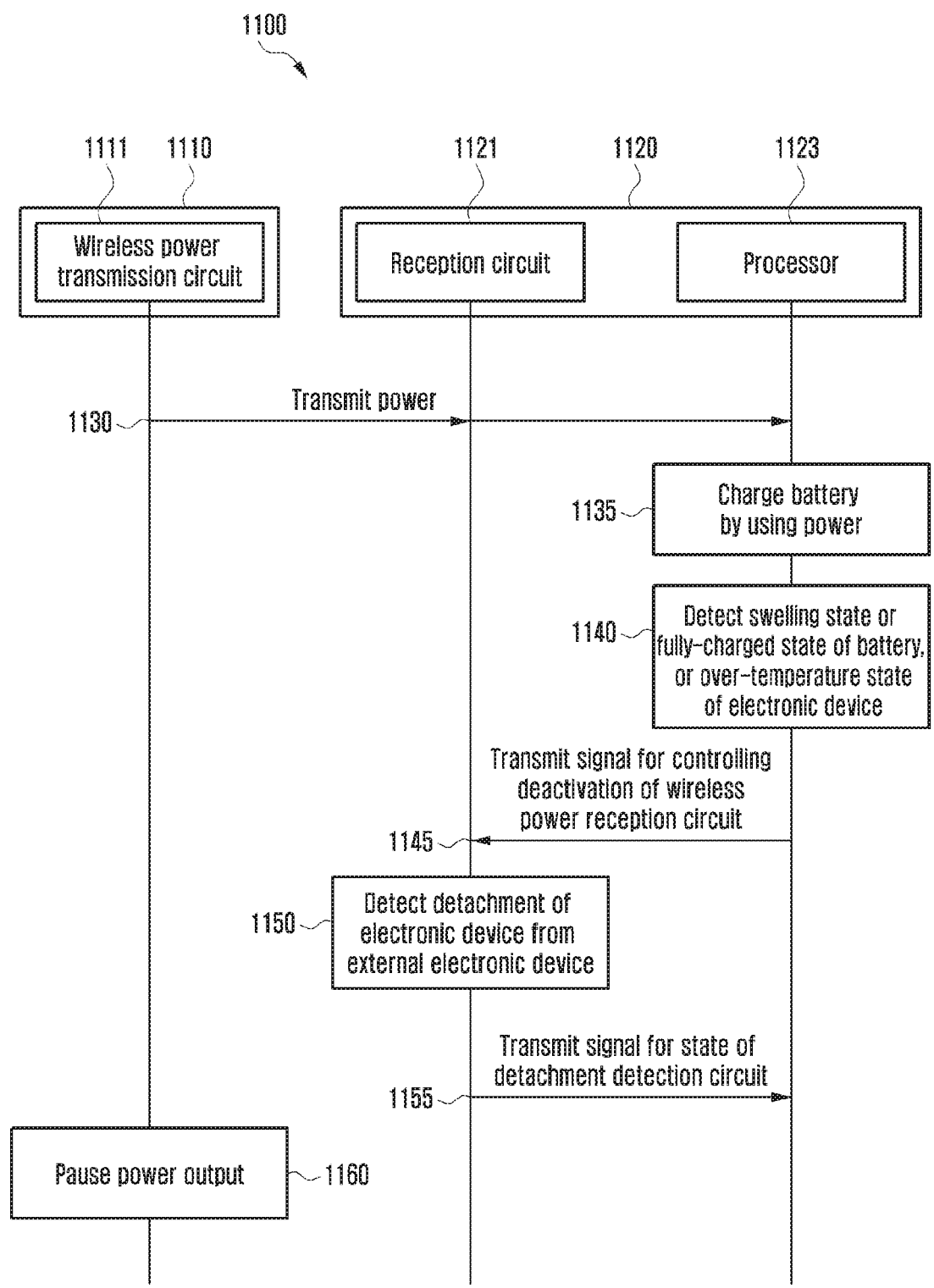
FIG. 11 is a diagram illustrating flows for wireless charging between an electronic device and an external electronic device according to various embodiments.

FIG. 11 is a diagram 1100 illustrating flows for wireless charging between an electronic device and an external electronic device according to various embodiments.

Since operations 1130 to 1145 in FIG. 11 according to an embodiment are the same as operations 1030 to 1045 in FIG. 10, the descriptions thereof will be omitted.

Referring to FIG. 11, a reception circuit 1121 (e.g. the power reception circuit 421 in FIG. 4B), in operation 1150, may detect detachment of an electronic device 1120 (e.g. the electronic device 402 in FIG. 4B) from an external electronic device 1110 (e.g. the external electronic device 401 in FIG. 4A). For example, the reception circuit 1021 may detect detachment of the electronic device 1120 from the external electronic device 1110 through a detachment detection circuit (e.g. the detachment detection circuit 427 in FIG. 4B) included in the reception circuit 1121.

According to an embodiment, when detachment of the electronic device 1120 from the external electronic device 1110 is detected, the reception circuit 1121, in operation 1155, may transmit a signal for a state of the detachment detection circuit to a processor 1123 (e.g. the processor 422 in FIG. 4B). For example, the signal for a state of the detachment detection circuit may include a signal indicating that the detachment detection circuit has been switched from a LOW state (e.g. a state where the electronic device 1120 has been attached to the external electronic device 1110) to a HIGH state (e.g. a state where the electronic device 1120 has been detached from the external electronic device 1110).

According to an embodiment, as an operation not illustrated, the wireless power transmission circuit 1111 of the external electronic device 1110 may transmit, at predetermined time intervals, wireless power or a signal (e.g. a ping signal) for detecting wireless power reception devices located within a predetermined range.

According to an embodiment, when the electronic device 1120 is detached, the external electronic device 1110 may not receive any response signal in response to the ping signal. When the response signal is not received in the predetermined number of attempts, the external electronic device 1110, in operation 1160, may pause power output of the wireless power transmission circuit 1111. Then, as an operation not illustrated, the external electronic device 1110 may control the wireless power transmission circuit 1111 in a default state. Because the power output has been paused, the controlling in the default state may include an operation of performing reset such that the operation of outputting power can be performed again.

According to an embodiment, when attachment of the electronic device 1120 to the external electronic device 1110 is detected after the external electronic device 1110 is reset, the processor 1123 may receive power wirelessly output from the external electronic device 1110 in operation 1130.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device comprising:
   a battery;
   a charging circuit;
   a wireless power reception circuit configured to acquire transmission power wirelessly output from an external electronic device;
   a detachment detection circuit configured to detect whether the external electronic device is detached; and
   a processor configured to:
      charge the battery through the charging circuit by using reception power acquired through the wireless power reception circuit;
      during the charging, obtain status information related to the charging of the battery;
      transmit a first specified signal to the external electronic device, the first specified signal corresponding to pausing the transmission power such that the external electronic device pauses outputting of the transmission power in response to the first specified signal, the transmitting of the first specified signal being at least based on the obtained status information;
      receive a checking signal from the external electronic device that is in a state where the external electronic device has paused outputting of the transmission power;
      in response to determining detachment of the external electronic device is not detected through the detachment detection circuit, transmit a second specified signal to the external electronic device, the second specified signal corresponding to resuming outputting of the transmission power such that the external electronic device resumes outputting of the transmission power in response to detecting the second specified signal; and
      charge the battery through the charging circuit by using reception power acquired through the wireless power reception circuit from the external electronic device in response to the second specified signal.

2. The electronic device of claim 1, wherein the processor is configured to:
   receive the checking signal transmitted from the external electronic device to check the electronic device, the checking signal transmitted while the external electronic device is in a state where the external electronic device has paused outputting of the transmission power; and
   transmit a response signal to the external electronic device in response to the received checking signal.

3. The electronic device of claim 1, wherein the processor is configured to transmit the first specified signal to the external electronic device through the wireless power reception circuit that communicates using a frequency band equal or adjacent to that of the transmission power.

4. The electronic device of claim 1, further comprising a communication circuit configured to communicate using a frequency band different from that of the transmission power,
   wherein the processor is configured to transmit the first specified signal to the external electronic device through the communication circuit.

5. The electronic device of claim 1, wherein the status information comprises at least one of information on a swelling state of the battery, information on a fully-charged state of the battery, or information on an over-temperature state of the electronic device.

6. The electronic device of claim 1,
wherein the processor is configured to detect at least one of: (i) a signal for resuming outputting of the transmission power; or (ii) through the detachment detection circuit, a signal related to a detachment state of the external electronic device in a state where the external electronic device has paused outputting of the transmission power.

7. The electronic device of claim 6, wherein the processor is configured to transmit the second specified signal to the external electronic device by using the wireless power reception circuit based on at least one of:
a determination that a remaining level of the battery measured a predetermined time period after the battery has reached a fully-charged state and is lower than a predefined value; or
a determination that a temperature inside the electronic device or of the battery is lower than a predefined value.

8. The electronic device of claim 6, wherein the processor is configured to:
transmit a response signal to the external electronic device in response to receiving the checking signal transmitted from the external electronic device to check the electronic device.

9. The electronic device of claim 6, wherein the processor is configured to:
receive a signal indicating a state of the detachment detection circuit from the detachment detection circuit; and
in response to determining detachment of the external electronic device is detected through the detachment detection circuit, determine to not transmit a response signal to the external electronic device in response to a checking signal transmitted from the external electronic device to check the electronic device.

10. An electronic device comprising:
a battery;
a charging circuit;
a wireless power reception circuit configured to acquire transmission power wirelessly output from an external electronic device; and
a processor configured to:
charge the battery through the charging circuit by using reception power acquired through the wireless power reception circuit;
during charging of the battery, obtain status information related to the charging;
receive a check signal from the external electronic device;
deactivate, at least based on the status information, the wireless power receiving circuit so that a response signal is not transmitted to the external electronic device in response to the check signal transmitted from the external electronic device;
transmit the response signal to the external electronic device when a signal for resuming wireless charging is detected and detachment of the external electronic device is not detected through a detachment detection circuit in a state configured such that the response signal is transmitted to the external electronic device; and
charge the battery through the charging circuit by using reception power acquired through the wireless power reception circuit from the external electronic device in response to the response signal.

11. The electronic device of claim 10, wherein the processor is configured to:
receive, from the detachment detection circuit, a signal indicating a state of the detachment detection circuit; and
determine to not transmit the response signal to the external electronic device in response to receiving the check signal transmitted from the external electronic device to check the electronic device when the state of the detachment detection circuit is a state where the wireless power reception circuit is detached from the external electronic device.

12. A method for wirelessly charging an electronic device receiving power wirelessly, the method comprising:
receiving, through a wireless power reception circuit, transmission power wirelessly output from an external electronic device;
charging a battery by using the received transmission power;
during the charging of the battery, obtaining status information related to the charging of the battery;
transmitting a first specified signal to the external electronic device based on the obtained status information, the first specified signal corresponding to pausing the transmission power such that the external electronic device pauses outputting of the transmission power in response to receiving the first specified signal, the transmitting of the first specified signal being at least based on the obtained status information;
receiving a checking signal from the external electronic device that is in a state where the external electronic device has paused outputting of the transmission power;
transmitting a second specified signal, corresponding to resuming outputting of the transmission power, to the external electronic device such that the external electronic device resumes outputting of the transmission power when a signal for resuming outputting of the transmission power is detected and detachment of the external electronic device is not detected through a detachment detection circuit; and
charging the battery through a charging circuit by using reception power acquired through the wireless power reception circuit from the external electronic device in response to the second specified signal.

13. The method of claim 12, further comprising transmitting a response signal to the external electronic device in response to receiving the checking signal transmitted from the external electronic device to check the electronic device in a state where the external electronic device has paused outputting of the transmission power.

14. The method of claim 12, wherein the status information comprises at least one of information on a swelling state of the battery, information on a fully-charged state of the battery, or information on an over-temperature state of the electronic device.

15. The method of claim 12, wherein the transmitting of the second specified signal to the external electronic device comprises determining that a signal for resuming wireless charging has been detected by the electronic device based on detecting at least one of:

a remaining level of the battery measured after a predetermined time period from a fully-charged state of the battery being lower than a predefined value; or a temperature inside the electronic device or of the battery being lower than a predefined value.

16. The method of claim 12, further comprising:

transmitting, to the external electronic device, the second specified signal corresponding to resuming outputting of the transmission power, and transmitting a response signal to the external electronic device in response to a checking signal transmitted from the external electronic device to check the electronic device.

17. The method of claim 12, further comprising:

based on detachment of the external electronic device being detected by the detachment detection circuit, receiving a signal indicating a state of the detachment detection circuit through the detachment detection circuit; and performing control such that no response signal is transmitted to the external electronic device in response to receiving a checking signal transmitted from the external electronic device to check the electronic device.

* * * * *